United States Patent
Audenaert et al.

(10) Patent No.: US 9,177,326 B2
(45) Date of Patent: Nov. 3, 2015

(54) METHOD AND SYSTEM FOR DETERMINING OVERALL CONTENT VALUES FOR CONTENT ELEMENTS IN A WEB NETWORK AND FOR OPTIMIZING INTERNET TRAFFIC FLOW THROUGH THE WEB NETWORK

(75) Inventors: Anke Audenaert, Los Angeles, CA (US); Hanno Lustig, Los Angeles, CA (US); Michele DiLorenzo, Beverly Hills, CA (US); Andres Rodriguez, Beaverton, OR (US)

(73) Assignee: OpenX Technologies, Inc., Pasadena, CA (US)

( * ) Notice: Subject to any disclaimer, the term of this patent is extended or adjusted under 35 U.S.C. 154(b) by 0 days.

(21) Appl. No.: 13/401,440

(22) Filed: Feb. 21, 2012

(65) Prior Publication Data
US 2012/0185329 A1    Jul. 19, 2012

Related U.S. Application Data

(63) Continuation of application No. 12/509,199, filed on Jul. 24, 2009, now Pat. No. 8,171,156.

(60) Provisional application No. 61/083,890, filed on Jul. 25, 2008.

(51) Int. Cl.
*G06F 15/16*     (2006.01)
*G06F 15/173*    (2006.01)
(Continued)

(52) U.S. Cl.
CPC ............ *G06Q 30/0247* (2013.01); *G06Q 30/02* (2013.01); *G06Q 30/08* (2013.01); *H04L 43/02* (2013.01); *H04L 67/22* (2013.01); *H04L 43/04* (2013.01)

(58) Field of Classification Search
CPC . H04L 12/2418; H04L 12/2626; H04L 47/18; H04L 47/801
USPC ......................................................... 709/235
See application file for complete search history.

(56) References Cited

U.S. PATENT DOCUMENTS 6,078,924 A  *  6/2000  Ainsbury et al. ..................... 1/1
6,978,420 B2 * 12/2005  Ching ........................... 715/229
(Continued)

FOREIGN PATENT DOCUMENTS

CN     101237343 B  *  8/2011
JP      07181971 A  *  7/1995

OTHER PUBLICATIONS

Azma, C. "Specification and Implementation of Dynamic Web Site Benchmarks," IEEE Intl. Workkshop on WOrkload Characterization, Nov. 25, 2002, pp. 3-13.*

(Continued)

*Primary Examiner* — Melvin H Pollack
(74) *Attorney, Agent, or Firm* — Patent Law Works LLP

(57) ABSTRACT

A method for optimizing traffic flow through a web network including collecting data corresponding to the content elements, determining a revenue value for each content element, calculating an overall content value for each content element based on the corresponding revenue value and revenue generated from subsequent flow of a user during a visit to the network, and modifying the network based on the overall content value and the content data, so as to maximize the value of the network. Also disclosed is a system for determining overall content values for a plurality of content elements including an analytic server for receiving content data corresponding to the content elements, and a processor determining a revenue value for each element and calculating an overall content value for each content element based on the corresponding revenue value and revenue generated from subsequent traffic flow of a user during a visit to the network.

32 Claims, 12 Drawing Sheets

(51) Int. Cl.
*G06Q 30/02* (2012.01)
*G06Q 30/08* (2012.01)
*H04L 12/26* (2006.01)
*H04L 29/08* (2006.01)

(56) References Cited

U.S. PATENT DOCUMENTS

| | | | |
|---|---|---|---|
| 7,069,318 B2 * | 6/2006 | Burbeck et al. | 709/224 |
| 7,246,083 B2 | 7/2007 | Bibelnieks et al. | |
| 7,249,094 B2 * | 7/2007 | Levchin et al. | 705/39 |
| 7,313,407 B2 | 12/2007 | Shapira | |
| 7,461,332 B2 * | 12/2008 | Brintzenhofe et al. | 715/205 |
| 7,475,404 B2 * | 1/2009 | Hamel | 719/317 |
| 7,502,819 B2 * | 3/2009 | Alonso | 709/203 |
| 7,508,753 B2 * | 3/2009 | Greenspan et al. | 370/218 |
| 7,516,086 B2 * | 4/2009 | Chu et al. | 705/14.71 |
| 7,516,177 B2 * | 4/2009 | Knapp et al. | 709/203 |
| 7,574,651 B2 * | 8/2009 | Ebrahimi et al. | 715/243 |
| 7,647,323 B2 * | 1/2010 | Kasriel et al. | 709/224 |
| 7,647,553 B2 * | 1/2010 | Mogilevsky et al. | 715/247 |
| 7,673,019 B2 * | 3/2010 | Chi et al. | 709/219 |
| 7,673,340 B1 * | 3/2010 | Cohen et al. | 726/22 |
| 7,711,598 B2 | 5/2010 | Perkowski | |
| 7,730,021 B1 * | 6/2010 | Morse et al. | 707/602 |
| 7,739,327 B2 | 6/2010 | Mutton et al. | |
| 7,779,147 B1 | 8/2010 | Wang et al. | |
| 7,814,139 B2 | 10/2010 | Singh et al. | |
| 7,818,419 B1 | 10/2010 | McAllister et al. | |
| 7,822,639 B2 * | 10/2010 | Shkedi | 705/14.73 |
| 7,826,351 B2 | 11/2010 | Rodriguez et al. | |
| 7,831,472 B2 | 11/2010 | Yufik | |
| 7,831,658 B2 * | 11/2010 | Khopkar et al. | 709/203 |
| 7,853,700 B2 | 12/2010 | Lee et al. | |
| 7,856,596 B2 | 12/2010 | Crider et al. | |
| 7,861,160 B2 | 12/2010 | Ohno | |
| 7,886,221 B1 | 2/2011 | Underwood et al. | |
| 7,890,511 B2 * | 2/2011 | Valimaki et al. | 707/737 |
| 7,895,076 B2 | 2/2011 | Kutaragi et al. | |
| 7,917,382 B2 * | 3/2011 | Cereghini et al. | 705/7.29 |
| 7,917,840 B2 | 3/2011 | Newman et al. | |
| 7,921,085 B2 * | 4/2011 | Guo et al. | 707/688 |
| 7,930,206 B2 * | 4/2011 | Koningstein | 705/14.45 |
| 7,941,525 B1 | 5/2011 | Yavilevich | |
| 7,941,535 B2 | 5/2011 | Sherrets et al. | |
| 7,944,456 B2 | 5/2011 | Seljavaara | |
| 7,953,777 B2 | 5/2011 | White et al. | |
| 7,958,189 B2 * | 6/2011 | Bernstein | 709/203 |
| 7,962,363 B2 * | 6/2011 | Patel et al. | 705/14.4 |
| 7,966,564 B2 * | 6/2011 | Catlin et al. | 715/745 |
| 7,987,261 B2 | 7/2011 | Gamble | |
| 7,991,640 B2 * | 8/2011 | Shapira et al. | 705/7.29 |
| 7,991,800 B2 * | 8/2011 | Lawrence et al. | 707/803 |
| 8,001,001 B2 * | 8/2011 | Brady et al. | 705/14.43 |
| 8,005,816 B2 | 8/2011 | Krishnaprasad et al. | |
| 8,010,694 B2 | 8/2011 | Doverspike et al. | |
| 8,027,879 B2 | 9/2011 | Ramer et al. | |
| 8,028,055 B2 | 9/2011 | Duffield et al. | |
| 8,042,132 B2 * | 10/2011 | Carney et al. | 725/37 |
| 8,055,709 B2 | 11/2011 | Singh et al. | |
| 8,069,099 B2 | 11/2011 | Chan et al. | |
| 8,078,763 B1 | 12/2011 | Boddu et al. | |
| 8,082,298 B1 * | 12/2011 | Nayfeh et al. | 709/203 |
| 8,082,361 B2 | 12/2011 | Alexander et al. | |
| 8,090,820 B2 | 1/2012 | Harmel et al. | |
| 8,095,645 B2 | 1/2012 | Ninan et al. | |
| 8,099,328 B2 * | 1/2012 | Protheroe et al. | 705/14.71 |
| 8,108,895 B2 * | 1/2012 | Anderson et al. | 725/36 |
| 8,140,704 B2 | 3/2012 | Archer et al. | |
| 8,145,704 B2 * | 3/2012 | Marcus | 709/203 |
| 8,160,909 B2 * | 4/2012 | Voda et al. | 705/7.11 |
| 8,161,182 B1 | 4/2012 | Cheng et al. | |
| 8,166,142 B2 | 4/2012 | Rudkin | |
| 8,166,155 B1 * | 4/2012 | Rachmeler et al. | 709/224 |
| 8,170,905 B2 | 5/2012 | Malov | |
| 8,170,913 B1 * | 5/2012 | Baluja | 705/14.43 |
| 8,171,120 B1 * | 5/2012 | Muhanna et al. | 709/221 |
| 8,180,918 B2 | 5/2012 | Day | |
| 8,185,651 B2 | 5/2012 | Moran et al. | |
| 8,195,831 B2 | 6/2012 | Swildens et al. | |
| 8,265,984 B2 * | 9/2012 | Bai et al. | 705/7.34 |
| 8,285,777 B2 * | 10/2012 | Giles et al. | 709/203 |
| 8,291,080 B2 * | 10/2012 | Miyakawa | 709/226 |
| 8,301,482 B2 * | 10/2012 | Reynolds et al. | 705/7.29 |
| 8,312,074 B2 * | 11/2012 | Stavrakos et al. | 709/203 |
| 8,402,157 B2 * | 3/2013 | Krassner et al. | 709/231 |
| 8,428,997 B2 * | 4/2013 | Maga et al. | 705/7.29 |
| 8,583,764 B2 * | 11/2013 | Jerome | 709/219 |
| 8,595,300 B2 * | 11/2013 | Underwood et al. | 709/205 |
| 8,605,594 B2 * | 12/2013 | Bader | 370/235 |
| 8,645,186 B2 * | 2/2014 | Moukas et al. | 705/7.29 |
| 8,661,111 B1 * | 2/2014 | Lauckhart et al. | 709/224 |
| 8,893,102 B2 * | 11/2014 | Keynes et al. | 717/157 |
| 2003/0187974 A1 * | 10/2003 | Burbeck et al. | 709/224 |
| 2007/0162396 A1 * | 7/2007 | Goldman et al. | 705/51 |
| 2008/0033996 A1 * | 2/2008 | Kesari | 707/104.1 |
| 2008/0162699 A1 * | 7/2008 | Gaffney | 709/226 |
| 2008/0243536 A1 * | 10/2008 | Dworkin et al. | 705/1 |
| 2008/0288306 A1 * | 11/2008 | MacIntyre et al. | 705/7 |
| 2009/0030755 A1 * | 1/2009 | Altberg et al. | 705/7 |
| 2009/0099902 A1 * | 4/2009 | Chatter et al. | 705/10 |
| 2009/0106103 A1 * | 4/2009 | Milana et al. | 705/14 |
| 2009/0164268 A1 * | 6/2009 | Hogan et al. | 705/7 |
| 2009/0192871 A1 * | 7/2009 | Deacon et al. | 705/10 |
| 2009/0217326 A1 * | 8/2009 | Hasek | 725/87 |
| 2009/0275313 A1 * | 11/2009 | Haleva et al. | 455/414.1 |
| 2009/0282052 A1 * | 11/2009 | Evans et al. | 707/10 |
| 2009/0282329 A1 * | 11/2009 | Alexander et al. | 715/243 |
| 2009/0327028 A1 * | 12/2009 | Collins | 705/10 |
| 2010/0076818 A1 * | 3/2010 | Peterson et al. | 705/10 |
| 2010/0228858 A1 | 9/2010 | Eilam et al. | |
| 2010/0241486 A1 | 9/2010 | Garg et al. | |
| 2010/0241507 A1 | 9/2010 | Quinn et al. | |
| 2011/0004698 A1 | 1/2011 | Wu | |
| 2011/0069616 A1 | 3/2011 | Revels | |
| 2011/0213822 A1 * | 9/2011 | Yavilevich | 709/202 |
| 2011/0246406 A1 * | 10/2011 | Lahav et al. | 706/46 |
| 2011/0261049 A1 | 10/2011 | Cardno et al. | |
| 2011/0276367 A1 * | 11/2011 | Shapira et al. | 705/7.29 |
| 2011/0313852 A1 | 12/2011 | Kon et al. | |
| 2012/0016740 A1 | 1/2012 | Ramer et al. | |
| 2012/0047122 A1 * | 2/2012 | Hauser | 707/709 |
| 2012/0110427 A1 * | 5/2012 | Krause | 715/208 |
| 2012/0134291 A1 | 5/2012 | Raleigh | |
| 2012/0179568 A1 | 7/2012 | Soroca et al. | |
| 2012/0272178 A1 * | 10/2012 | Oygard et al. | 715/781 |
| 2013/0117663 A1 * | 5/2013 | Blinnikka et al. | 715/243 |

OTHER PUBLICATIONS

Charikar et al., "On Targeting Markov Segments," Proceedings of the Thirty-First Annual ACM Symposium on Theory of Computing, 1999, pp. 99-108.

Foder, G., "Revenue Optimization and Fairness Control of Priced Guaranteed and Best Effort Services on an ATM Transmission Link," IEEE International Conference on Communications, vol. 3, Jun. 7-11, 1998, pp. 1696-1705.

Azma, C., "Sepcification and Implementation of Dynamic Web Site Benchmarks," IEEE International Workshop on Workload Characterization, Nov. 25, 2002, pp. 3-13.

* cited by examiner

$P_j$

|   | 1 | 2 | 3 | 4 | 5 | 6 | 7 | ... | N | 0 |
|---|---|---|---|---|---|---|---|---|---|---|
| 1 | $C_{1,1}$ | $C_{1,2}$ | $C_{1,3}$ | $C_{1,4}$ | $C_{1,5}$ | $C_{1,6}$ | $C_{1,7}$ | | $C_{1,N}$ | $C_{1,0}$ |
| 2 | $C_{2,1}$ | $C_{2,2}$ | $C_{2,3}$ | $C_{2,4}$ | $C_{2,5}$ | $C_{2,6}$ | $C_{2,7}$ | | $C_{2,N}$ | $C_{2,0}$ |
| 3 | $C_{3,1}$ | $C_{3,2}$ | $C_{3,3}$ | $C_{3,4}$ | $C_{3,5}$ | $C_{3,6}$ | $C_{3,7}$ | | $C_{3,N}$ | $C_{3,0}$ |
| 4 | $C_{4,1}$ | $C_{4,2}$ | $C_{4,3}$ | $C_{4,4}$ | $C_{4,5}$ | $C_{4,6}$ | $C_{4,7}$ | | $C_{4,N}$ | $C_{4,0}$ |
| 5 | $C_{5,1}$ | $C_{5,2}$ | $C_{5,3}$ | $C_{5,4}$ | $C_{5,5}$ | $C_{5,6}$ | $C_{5,7}$ | | $C_{5,N}$ | $C_{5,0}$ |
| 6 | $C_{6,1}$ | $C_{6,2}$ | $C_{6,3}$ | $C_{6,4}$ | $C_{6,5}$ | $C_{6,6}$ | $C_{6,7}$ | | $C_{6,N}$ | $C_{6,0}$ |
| 7 | $C_{7,1}$ | $C_{7,2}$ | $C_{7,3}$ | $C_{7,4}$ | $C_{7,5}$ | $C_{7,6}$ | $C_{7,7}$ | | $C_{7,N}$ | $C_{7,0}$ |
| . | | | | | | | | | | |
| N | $C_{N,1}$ | $C_{N,2}$ | $C_{N,3}$ | $C_{N,4}$ | $C_{N,5}$ | $C_{N,6}$ | $C_{N,7}$ | | $C_{N,N}$ | $C_{N,0}$ |
| 0 | $C_{0,1}$ | $C_{0,2}$ | $C_{0,3}$ | $C_{0,4}$ | $C_{0,5}$ | $C_{0,6}$ | $C_{0,7}$ | | $C_{0,N}$ | |

$P_i$ labels the rows.

FIGURE 6

| Overall Content Value | Content Element |
|---|---|
| 344.8405 | Page x1: http://www.Sitex.com/pagex |
| 337.5152 | Page x2: http://www.Sitex.com/pagex |
| 330.9571 | Page x3: http://www.Sitex.com/pagex |
| 294.6983 | Page x4: http://www.Sitex.com/pagex |
| 225.9808 | Page x5: http://www.Sitex.com/pagex |
| 172.8176 | Page x6: http://www.Sitex.com/pagex |
| 172.8095 | Page x7: http://www.Sitex.com/pagex |
| 167.5489 | Page x8: http://www.Sitex.com/pagex |
| 163.7892 | Page x9: http://www.Sitex.com/pagex |
| 153.0309 | Page x10: http://www.Sitex.com/pagex |
| 144.4983 | Page x11: http://www.Sitex.com/pagex |
| 144.4653 | Page x12: http://www.Sitex.com/pagex |
| 137.2887 | Page x13: http://www.Sitex.com/pagex |
| 136.5325 | Page x14: http://www.Sitex.com/pagex |
| 136.2025 | Page x15: http://www.Sitex.com/pagex |
| 132.346 | Page x16: http://www.Sitex.com/pagex |
| 129.1548 | Page x17: http://www.Sitex.com/pagex |
| 127.2634 | Page x18: http://www.Sitex.com/pagex |
| 126.4632 | Page x19: http://www.Sitex.com/pagex |
| 125.3096 | Page x20: http://www.Sitex.com/pagex |
| 124.4397 | Page x21: http://www.Sitex.com/pagex |
| 124.2831 | Page x22: http://www.Sitex.com/pagex |
| 123.0023 | Page x23: http://www.Sitex.com/pagex |
| 122.4178 | Page x24: http://www.Sitex.com/pagex |
| 121.0419 | Page x25: http://www.Sitex.com/pagex |
| 119.8745 | Page x26: http://www.Sitex.com/pagex |
| 119.2895 | Page x27: http://www.Sitex.com/pagex |
| 119.2386 | Page x28: http://www.Sitex.com/pagex |
| 118.7658 | Page x29: http://www.Sitex.com/pagex |
| 118.0873 | Page x30: http://www.Sitex.com/pagex |
| 116.2547 | Page x31: http://www.Sitex.com/pagex |
| 116.0707 | Page x32: http://www.Sitex.com/pagex |
| 115.6957 | Page x33: http://www.Sitex.com/pagex |
| 115.2939 | Page x34: http://www.Sitex.com/pagex |
| 115.1352 | Page x35: http://www.Sitex.com/pagex |
| 114.7276 | Page x36: http://www.Sitex.com/pagex |
| 114.5868 | Page x37: http://www.Sitex.com/pagex |
| 111.1777 | Page x38: http://www.Sitex.com/pagex |
| 110.6821 | Page x39: http://www.Sitex.com/pagex |
| 109.7107 | Page x40: http://www.Sitex.com/pagex |
| 106.6855 | Page x41: http://www.Sitex.com/pagex |
| 103.7487 | Page x42: http://www.Sitex.com/pagex |
| 101.1866 | Page x43: http://www.Sitex.com/pagex |
| 100.5543 | Page x44: http://www.Sitex.com/pagex |
| 100.3554 | Page x45: http://www.Sitex.com/pagex |
| 100.3554 | Page x46: http://www.Sitex.com/pagex |
| 100.3554 | Page x47: http://www.Sitex.com/pagex |
| 100.0736 | Page x48: http://www.Sitex.com/pagex |
| 97.7223 | Page x49: http://www.Sitex.com/pagex |
| 96.5007 | Page x50: http://www.Sitex.com/pagex |
| 92.3642 | Page x51: http://www.Sitex.com/pagex |
| 92.3642 | Page x52: http://www.Sitex.com/pagex |
| 92.3642 | Page x53: http://www.Sitex.com/pagex |
| 92.3642 | Page x54: http://www.Sitex.com/pagex |
| 92.3642 | Page x55: http://www.Sitex.com/pagex |
| 92.3642 | Page x56: http://www.Sitex.com/pagex |
| 91.642 | Page x57: http://www.Sitex.com/pagex |
| 89.6548 | Page x58: http://www.Sitex.com/pagex |
| 89.0072 | Page x59: http://www.Sitex.com/pagex |
| 87.3784 | Page x60: http://www.Sitex.com/pagex |
| 78.2794 | Page x61: http://www.Sitex.com/pagex |
| 76.6962 | Page x62: http://www.Sitex.com/pagex |
| 76.4849 | Page x63: http://www.Sitex.com/pagex |
| 75.2968 | Page x64: http://www.Sitex.com/pagex |
| 58.2394 | Page x65: http://www.Sitex.com/pagex |
| 0 | Exited the site |

FIGURE 9A

| Content Element | View Value | Overall Content Value |
|---|---|---|
| Page 1 | $Z_1$ | $v_1$ |
| Page 2 | $Z_2$ | $v_2$ |
| Page 3 | $Z_3$ | $v_3$ |
| . . . | . . . | . . . |
| Page X | $Z_x$ | $v_x$ |
| Page Y | $Z_y$ | $v_y$ |
| Page Z | $Z_z$ | $v_z$ |

FIGURE 9B

METHOD AND SYSTEM FOR DETERMINING OVERALL CONTENT VALUES FOR CONTENT ELEMENTS IN A WEB NETWORK AND FOR OPTIMIZING INTERNET TRAFFIC FLOW THROUGH THE WEB NETWORK

CROSS-REFERENCE TO RELATED APPLICATION

This application is a continuation of U.S. Application No. 12/509,199, filed on Jul. 24, 2009 now U.S. Pat. No. 8,171,156, incorporated by reference in its entirety, which is a continuation-in-part of U.S. Provisional Application No. 61/083,890, filed Jul. 25, 2008 entitled "Method for Evaluating the Effectiveness of a Web Page and Optimizing Traffic Through a Web Site or Network of Sites Containing a Plurality of Web Pages," incorporated by reference in its entirety.

BACKGROUND OF THE INVENTION

1. Field of the Invention

This invention relates to the internet. In particular, this invention relates to a method and system for determining overall content values for one or more content elements or groups of content elements in a website or network of sites, and optimizing internet traffic flow through the website or network of sites.

2. Discussion of the Related Art

Conventionally, the work of determining the value of a web site and of optimizing traffic through such web site to maximize the value of the web site have focused on analyzing the revenue generated on every page of the web site in isolation. Such a conventional approach is depicted in FIG. 1. In FIG. 1, a web page P is shown having three revenue-generating components, A, B and C. In conventional methods, the revenue from each component is added up to determine the revenue value of the web page:

$$\$A + \$B + \$C = R \qquad \text{(Equation 1)}$$

Once the revenue value R for each page is determined, the overall revenue of the web site or network of sites ($R_{Net}$) may be determined by simply adding together the revenue value R for each page P, such that:

$$R_1 + R_2 + R_3 \ldots R_N = R_{Net} \qquad \text{(Equation 2)}$$

Traffic has then typically been guided (such as through content promotion or advertising) to the pages of the web site or network of sites that are determined to generate the highest revenue per page. However, a visit to a web site by a user is usually not limited to viewing one page, but to viewing a network of interconnected pages, in a dynamic equilibrium, as depicted in FIG. 2A. FIG. 2A illustrates a web site 200 made up of a plurality of interconnected pages. In FIG. 2A, each of the pages $P_1$ through $P_y$ represents a web page within the web site 200. In some cases, web site 200 may be a network of web sites. The network of sites may be, for example and without limitation, a plurality of commonly managed or commonly owned sites; an advertising network of sites, where ads may be sold by one entity or by a plurality of related or unrelated entities; and/or a collection of other websites provided by related or unrelated entities that have decided to pool resources in order to optimize their revenue. For sake of simplicity, references in the application to a web site should also be read to refer to a network of web sites where appropriate.

As shown in FIG. 2A, each page, $P_i$, in web site 200 may include links, represented by the arrows between pages, that allow a user on that particular page to jump to another page within the web site. FIG. 2B illustrates another group of interconnected content elements in a static sequential arrangement, as is also known in the prior art. The illustration of FIG. 2B may be used to serve a lengthy video episode wherein the video episode is divided into a plurality of segments each having a predetermined running time and advertising content is served between the plurality of video segments. Although not explicitly depicted in FIGS. 2A and 2B, it should also be understood that the interconnected equilibrium also includes the further option of exiting from the web site 200 from any of the pages $P_1$ through $P_y$ (or during any of the video segments or ads), which may be accomplished simply by closing the web browser, clicking on a link (such as in a "favorites" list) to another website, or manually inputting a URL of another web site. It is a drawback of traditional methods of determining the value of web pages and web sites that this interconnected equilibrium is all but ignored, and only the revenue generated on a single page is taken into account in determining the value of that page.

Furthermore, with current evaluation methods, the focus of optimization has been on traffic acquisition, which deals with present or immediate value, but which does not take into account future value arising from subsequent pages viewed by a user during a visit to the particular website or network of sites. Current methods that do not take into account the value associated with the subsequent or "next page" future traffic flow of a user during a website visit do not allow the publisher of the web site to adequately optimize the revenue generated by that web site. Rather, by using currently known methods, traffic is optimized on the basis of the immediate revenue that can be generated by a single given web page, without taking into account the total revenue potential for each visit to the web site or network of sites.

Conventional methods that do not take into account the value of traffic flow do not properly value, or allow for adequate optimization of, the revenue generated by a web site or network of sites. Traffic is generally managed on the basis of the immediate revenue that can be generated, without taking into account the total revenue potential for each visit/view. The inventive method overcomes this drawback by focusing on the entire web site or network of sites and by taking into account value generated from the user's journey through the site(s), reflecting the potential for a user to generate revenue once that user has landed on a particular page within the website or network of sites.

There is a need in the industry for a method of determining overall dollar (or other) value of a web page, web site, and/or network of web sites that takes into account what happens after a user enters the web site or network of sites, and/or after a user views any particular page within the website or network of sites. In particular, there is a need for a method of measuring or determining the value (such as the dollar value) of attracting one additional user to a web page or other content element. There is a further need in the industry for a means of optimizing traffic flow within a web site or network of sites that takes into account the entire journey within the web site or network of sites taken by its visitors.

SUMMARY OF THE INVENTION

Disclosed generally is a system and method for determining overall content value (in monetary units or otherwise) for content elements or groups of content elements in a web site or network of sites, taking into account the interlinked, networked characteristic of such web site or network of sites, and the dynamic journey a user is likely to take through such web site or network of sites on a given visit, where the journey includes a traffic route through different content elements on the web site or network of sites.

In particular, a method for optimizing internet traffic flow through a web network containing a plurality of interlinked content elements is disclosed. In one embodiment, the method includes collecting content data corresponding to a content element in the web network, obtaining a revenue value corresponding to the content element based on the corresponding content data, calculating a subsequent flow value corresponding to the content element, calculating an overall content value for the content element based on the corresponding subsequent flow value and the corresponding revenue value, and modifying the web network based on the overall content value and the content data, so as to increase overall revenue generated by the web network.

In one embodiment, the overall content values may be determined based on the following value function:

$$v_i = R_i + \beta \Sigma_{j=1}^{N} \pi_{i,j} v_j,$$

where $v_i$ is the overall content value for the content element; $v_j$ is the overall content value for a next content element; $\beta = 1/(1+r)$; r represents the cost of capital over a relevant predetermined time interval; $\pi_{i,j}$ is a probability of a transition from the content element to the next content element, and N is equal to a number of content elements. The above value function may be further expressed in matrix form as set forth below:

$$\overline{V}_{k+1} = \overline{R} + \beta \Pi \overline{V}_k,$$

where $\overline{V}_{k+1}$ is a matrix of a plurality of overall content values for the (k+1)-th iteration; $\beta = 1/(1+r)$; r represents the cost of capital over a relevant predetermined time interval; $\overline{R}$ is a matrix of revenue values; $\Pi$ is a matrix of transition probabilities and $\overline{V}_k$ is a matrix of a plurality of overall content values for the k-th iteration.

In the disclosed method, the content data, which may be collected statically or dynamically, may include traffic data and value data, and/or the traffic data may include transition values and view values. In addition, the method may include generating a result for use in modifying the web network based on the overall content value and the content data. The result may be, for example, a ranking of a plurality of content elements based on corresponding overall content values, a ranking of a plurality of content elements based on corresponding view values, a scatter plot for a plurality of content elements based on view values and overall content values, and/or a correlation coefficient representing a correlation between overall content values and view values of a plurality of content elements. The disclosed method may further include identifying at least one content element with a significant imbalance between the content element's overall content value and view value, based on the correlation, and modifying the web network so as to reduce the imbalance.

Also disclosed is a system for determining an overall content value for a content element in a web network containing a plurality of interlinked content elements. In one embodiment, the system may include an analytic server configured to receive content data relating to the content element, and a processor in operable communication with the analytic server. The processor may be configured to receive a revenue value for the content element based on the content data, and to determine a subsequent flow value for the content element, and may be further configured to calculate an overall content value based on the revenue value and the subsequent flow value. In one embodiment, the system may further include a filter module configured to filter a plurality of overall content values. In calculating the overall content values, the processor may implement the value function and/or matrix equation set forth above.

Also disclosed is a method for optimizing internet traffic flow through a web network containing a plurality of interlinked content elements. In one embodiment, optimizing includes receiving an overall content value corresponding to a content element, wherein the overall content value is based on a revenue value corresponding to the content element, and a subsequent flow value corresponding to the content element; balancing the overall content element with a cost associated with the content element; and then modifying the web network based on the balancing, so as to increase overall revenue generated by the web network. The balancing may include determining an internal rate or return (IRR) based on the overall content value and the cost, and the website may be modified based on the IRR so as to increase the IRR. In addition or in the alternative, the method may include determining a minimum desired IRR for the content element, and the website may then be modified by, for example, bidding on a search engine keyword up to a maximum bid amount based on the minimum IRR.

It is an advantage of the inventive method that it provides a tool that focuses on optimizing the traffic flow through a web site or network of sites with an eye toward maximizing the value gained from that traffic by exposing the traffic to more of the web pages within the web site, and thus, to more advertising, messages or other value-added opportunities.

Optimizing a web site or network of sites for maximum value means managing the entire traffic flow, rather than focusing on the value (e.g. revenue) generated on any of the pages in isolation. The value of a content element is thus a combination of the value generated by that content element and the value that will be generated on the subsequent content element visited after the present content element. The inventive method thus takes into account the present and the subsequent value generated both directly and indirectly by a content element view, making for a much more robust method to optimize the traffic flow through a web site or network of sites. Optimizing the traffic flow for a web site or network of sites may include generating as many page views as possible in the pages with the highest content element value, e.g., trying to achieve a perfect correlation between the popularity of a web page or content element and its overall content value.

These and other objects and advantages of the present disclosure will be apparent to those of ordinary skill in the art having the present drawings, specifications, and claims before them. It is intended that all such additional systems, methods, features, and advantages be included within this description, be within the scope of the disclosure, and be protected by the accompanying claims.

BRIEF DESCRIPTION OF THE DRAWINGS

The invention may be better understood by referring to the following figures. The components in the figures are not necessarily to scale, emphasis instead being placed upon illustrating the principles of the invention.

FIG. 6 illustrates of an example implementation of a count matrix C.

FIG. 9A illustrates a sample report in table format listing the overall content values for sixty-five interlinked content elements in a web network.

FIG. 9B illustrates another type of report in table format listing view values for content elements in a web network.

DETAILED DESCRIPTION OF THE PREFERRED EMBODIMENTS

Figure 1:
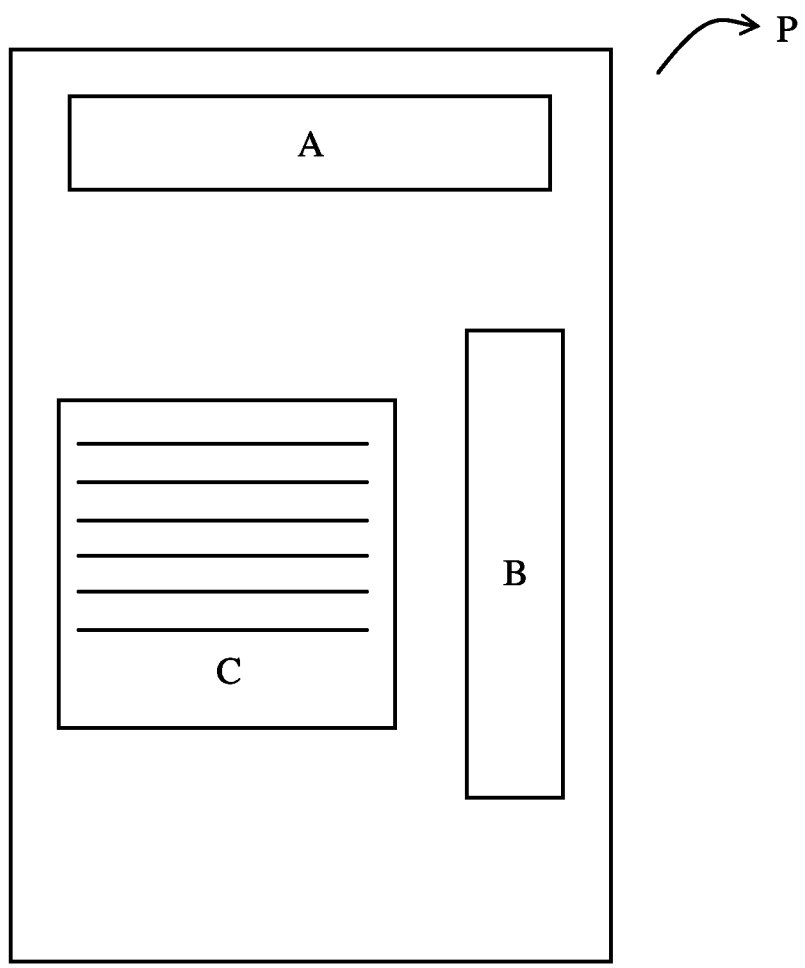
FIG. 1 is a schematic representation of an example of a conventional prior art web page having multiple revenue-generating components.
Figure 2A:
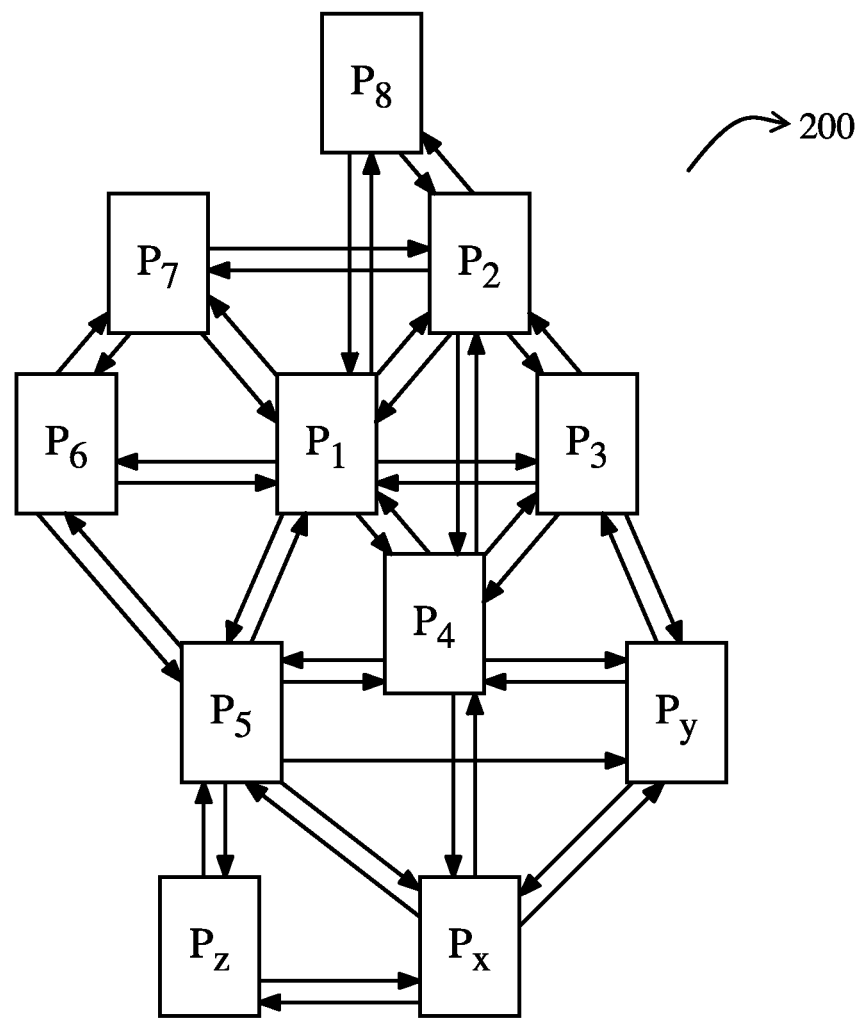
FIG. 2A illustrates one network of interconnected content elements in a web network, as is known in the prior art.
Figure 2B:
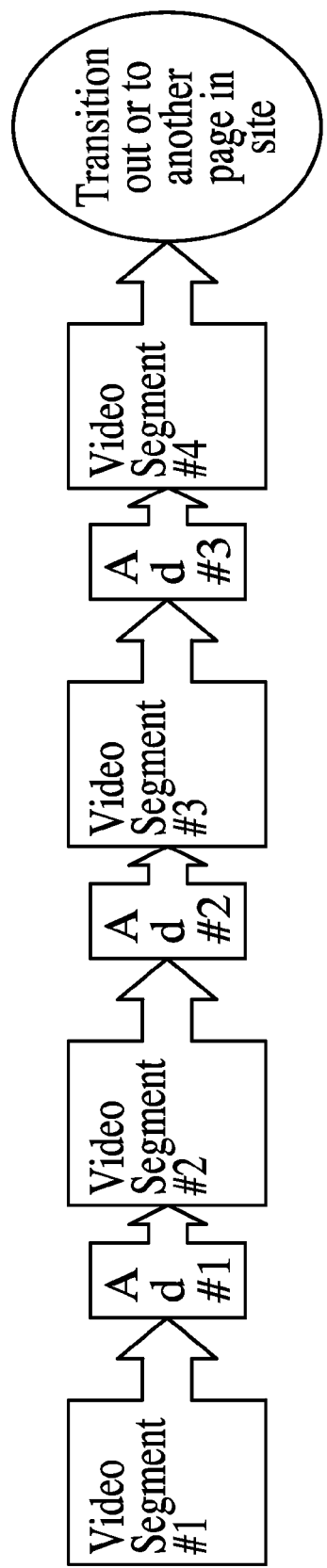
FIG. 2B illustrates another group of interconnected content elements in a static sequential arrangement, as is known in the prior art.

The present invention is directed to a method for determining overall content values (in monetary units or otherwise) for one or more content elements or groups of content elements in a web site or network of web sites, and optimizing the traffic flow toward maximizing the overall revenue generated by the site or network of sites. For ease of description, the term "web network" will he used to refer to a web site or a network of web sites, individually and collectively. The term "content element" refers to any type of content on a web network, including by way of example only and without limitation, web pages, web page types, web page elements, videos, photos, widgets, flash modules, AJAX modules, ad units of all types (such as, for example and without limitation, display, banner, video, search and other known types of ad units), or combinations thereof. For ease of description, the term "content element" may be used to refer to a content element or a group of content elements, individually and collectively. Further, in a web network having N content elements being analyzed, the i-th content element may be referred to herein as $P_i$. In a preferred embodiment, a plurality of content elements $P_1$-$P_N$ are interlinked with one another in the web network. Also in a preferred embodiment, the interlinked content elements include web pages that are part of a network of advertising pages or other content elements.

The term "web" or "internet" as used herein is intended to convey the meaning of a generally available network that is not confined to access by a single specific company or end user. This includes a virtual private network between an end user and an administrator, as well as a connection over a private cable TV IP network.

The system associated with and/or implementing the invention may consist of functions performed in serial or in parallel on the same computer or across a local or wide area network distributed on a plurality of computers. Each of the servers, engines or computers used in the system (each individually referred to as a "computer" or collectively as "computers") may be general purpose computer systems which are programmable using a high level computer programming language, such as "C, "Java" or "Pascal." The computers may also be specially programmed, special purpose hardware. Each computer may have a single processor, a multiprocessor or may be comprised of multiple computers, each of which may include a single processor or a multiprocessor, operably connected over a computer network. Each computer may be controlled by one of a variety of operating systems including Microsoft Windows, Macintosh, Linux, Unix, or a Java based operating system, to name a few.

Each computer in the system may include one or more input and output (I/O) unit, a memory system, and one or more processing units. The I/O units of each computer may be connected to various input/output devices, such as a mouse, keyboard, video card (video monitor), sound card (with speakers), network card and printer. The memory system in a typical general purpose computer system usually includes a computer readable and writeable nonvolatile recording medium, of which a magnetic disk, a flash memory and tape are examples. The memory system operably holds the operating system, utilities, and application programs. It should also be understood the invention is not limited to the particular input devices, output devices, or memory systems used in combination with the computer system or to those described herein. Nor should the invention be limited to any particular computer platform, processor, or high-level programming language.

Figure 3:
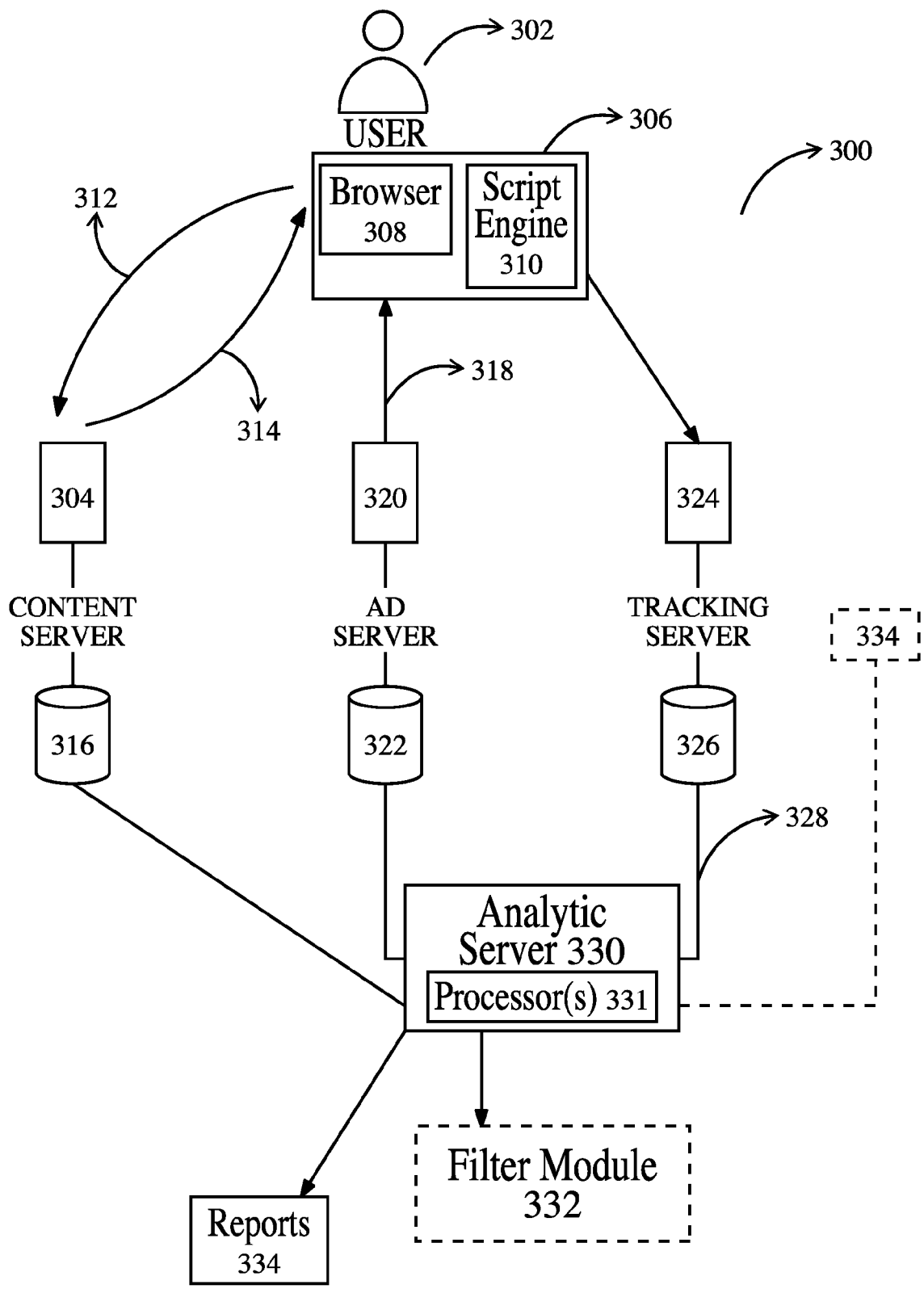
FIG. 3 is a block diagram illustrating the system architecture for one example implementation of an embodiment of a system for determining overall content values for the content elements of a web network according to the invention.

FIG. 3 shows a block diagram illustrating one particular example implementation of an embodiment of a system 300 for determining overall content values for the content elements of a web network. As shown in FIG. 3, a user 302 accesses content from a content server 304 via a user interface on a user device 306, such as a retail store kiosk, a personal computer, a mobile communication device or a cable set top box. The user interface may include, for example and without limitation, a mouse, keyboard, touch or voice user interface, remote control, web camera and/or monitor. The user device 306 may have various software applications, including a conventional web browser 308 and a script engine 310 for loading, compiling and running script code such as, without limitation, JavaScript, Python, PHP, Ruby, Lua and Perl. The content server 304 receives requests 312 from the user device 306 and serves content 314 in response to such requests 312. The content served 314 may include code embedded in the content for purposes of collecting predetermined categories of data from the user's browser 308 and/or it may include a reference to code located on a different server used for the same or a similar purpose. The content server 304 is preferably operably connected to one or more content management systems ("CMS s") 316 which may include advertising strategy and which allows the publisher or content provider to easily update content on the content server 304.

Advertising content 318 may be included in one or more content elements within any web page, $P_i$, within a given web site 200 (or web network). Such advertising content 318 may be served to the user by one or more ad servers 320. The ad servers 320 generally include means for managing a request from the content server 304 to deliver an advertisement and a data base 322 containing advertising content, pricing and other revenue based information associated with the advertising content, non-revenue based value information associated with the advertising content, and metadata identifying aspects of the advertising content. In many ad servers, the means for managing a request from the content server is influenced by the content being served by the content server 304. One or more ad servers 320 may be hosted by the web network provider, publisher or owner (individually and collectively referred to herein as the "publisher" of the web network); an independent ad provider; individual retailers; or any other third party that may host and serve advertisements on the web. In addition or in the alternative, content (e.g., in the form of videos, banners, or other types of content elements or ad units) may be called in by a particular ad server or other content server from an outside, third-party server, such as, for example, in connection with syndication or other similar deals. Such content may itself constitute or include advertising content, and/or it may have advertising or other content inserted into it from the web network publisher, from the outside third-party server, or from yet another server altogether.

The described system 300 may further include a tracking server 324 that monitors and tracks content data, or content data access, associated with the web site (or network) 200, and collects and records such data/data access in one or more tables or logs 326. More particularly, the tracking data 326 that is tracked and collected includes information relating to the number of times users visit a given content element, $P_i$, as well as the number of times users jump or transition from one content element to another content element within the web site 200. Once tracked and collected, the tracking data may be transformed into one or more matrices 328, which is explained further below.

In addition, or in the alternative, to tracking and collecting content data electronically via, for example, a tracking server 324 and/or ad server 322, it will be understood by one of skill in the art that certain of the content data (e.g., ad prices, pre-assigned value data, etc.) may be collected manually, and the manually collected data 334 may then be provided directly to the analytic server 330 for later processing.

The advertising information 322 and tracking data 326 may then be provided to one or more analytic servers 330, each of which may include, or otherwise be in operable communication with, one or more processors 331. The analytic servers 330 may be used to, among other things, process the overall content value for each web page (or other content element), as described below. The analytic servers 330 may also process the pricing information, content data and results to be used in generating tables, rankings, scatter plots and other reports, as well as generating regression lines and determining correlations, as explained further below.

In one example implementation of the system 300 of FIG. 3, a filter module 332 may be operably connected to the analytic server 330. The filter module 332 may be configured to filter out or otherwise override one or more content elements or groups of content elements from the results provided by the analytic servers 330. The filtered (and/or unfiltered) results are then processed by the analytic server 330 to generate calculations and/or reports 334 that may be used to evaluate and optimize traffic flow through, and revenue generated by, the web network. The filtering may be desirable for various reasons. For example, if a web network publisher adds a new web site to an already established web network, the values associated with the new content elements may initially be very low merely because the new web is not yet established. As such, the contribution of these low values to the analysis may artificially (and inappropriately) skew the result. Thus, in this example, the filter module 332 may be used to temporarily (or permanently) override, eliminate or artificially inflate (or deflate as appropriate) the values of the new content elements until the new web site gains sufficient recognition to be indicative of the actual value of the web site. In another example, the filter module 332 could be used to provide analysis of a "what if" scenario associated with planning to discontinue or otherwise remove content from the web site 200.

As another example where filtering results may be desirable would be where a web network experiences a denial-of-services attack ("DoS attack"), wherein one or more web sites within the web network are flooded with false requests for content, thus precluding the website or web network from functioning properly. In such a case, the publisher of the attacked web network may want to filter out results associated with the attacked content, as the false requests are not likely indicative of actual content value associated with the corresponding content elements. Other exemplary uses of the filter module 332 will be understood by those of skill in the art having the present specification before them.

The analytic server 330 may reside, for example, on an independent computer or on the same computer as any or all of the content server 304, ad server 320, and tracking server 324. In fact, it should be noted that it is contemplated that all of the servers in system 300 may be disposed on a single computer system. It would similarly be understood by one of ordinary skill in the art having the present specification before them that references to a server herein should not be limited to a single physical server. For example, a content provider may deploy content over a plurality of servers. Similarly, ad providers may serve advertisements from one or more ad servers. Similarly, the tracking and analytical functions may be accomplished by more than one tracking and analytic server, respectively. Particularly in the case of a tracking server 324 tracking data from a web network with millions of page views daily, and/or in the case of an analytic server running massive, complex computations on the millions of page views, multiple servers may be used to handle such massive and complex tracking and computations. The illustration of a single content server and CMS is for ease of explanation and should not be construed to limit the present invention in any way.

Figure 4:
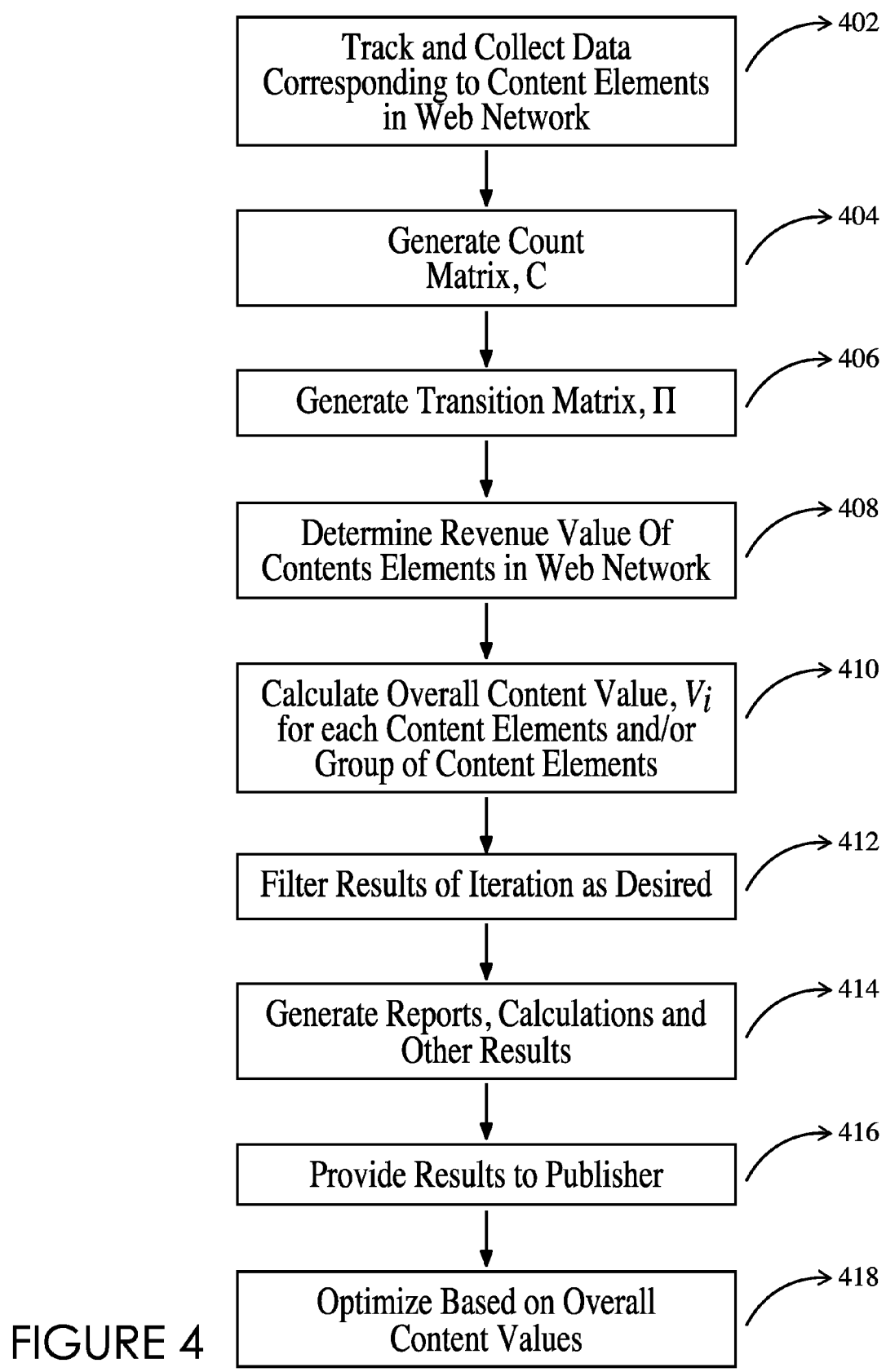
FIG. 4 illustrates one example implementation of a method for optimizing internet traffic flow through a web network by determining overall content values for each content element in a web network.

FIG. 4 illustrates one example implementation of a method for optimizing internet traffic flow through a web network by determining overall content values, v, for each content element, P, in a web network having N content elements being analyzed. The "overall content value" (v) of a content element is the revenue value R of the content element plus a subsequent flow value ("SFV") of the content element. In other words, $$v_i = R_i + SFV_i \quad \text{(Equation 3)};$$

where $v_i$ denotes the overall content value for the i-th content element, $P_i$; $R_i$ denotes the revenue value of the content element, $P_i$ (that is, the value that the content element $P_i$ is determined to contribute on its own, without regard to future traffic flow of the user requesting $P_i$); and $SFV_i$ denotes the subsequent flow value for the content element, $P_i$. The overall content values are expressed using any suitable units. For example, in one preferred implementation, the values are expressed in dollars (or other currency), revenue per thousand impression (RPM), or some other suitable unit of revenue or value measurement.

A "subsequent flow value" or "SFV" of a content element in a web network is defined as a value that reflects or takes into account value and/or revenue generated (or estimated to be generated) from subsequent traffic flow of a user during a visit to the web network. Thus, while the revenue value R of a content element takes into account only the present value of the content element from current actual or estimated revenue and/or current subjective strategic value, the subsequent flow value of that content element may take into account revenue and/or strategic value from future viewing events (i.e., "transitions" as later defined) within the web network during a user's current visit to the web network based, at least in part, on the traffic data and value data.

In a preferred embodiment, for any given user's traffic route within the web network in the user's current visit to that web network, the SFV of a content element takes into account the probability that the traffic will flow to the other content elements in the web network, and the probability that the traffic will continue to flow from each subsequent content element to other subsequent content elements in the web network, or the probability that the next page the user visits is outside the web network. However, the task of determining all possible routes and scenarios may be overly complex (and in some cases too processing-intense), cumbersome or time consuming, so as one potential alternative, these probabilities may focus on categories or groups of subsequent content elements. Generally, the more content elements (e.g., web pages) a user visits after visiting an initial content element (also referred to as the "referrer" or "referring" content element, $P_{ref}$), the greater the SFV will be for that referring content element.

Figure 5:
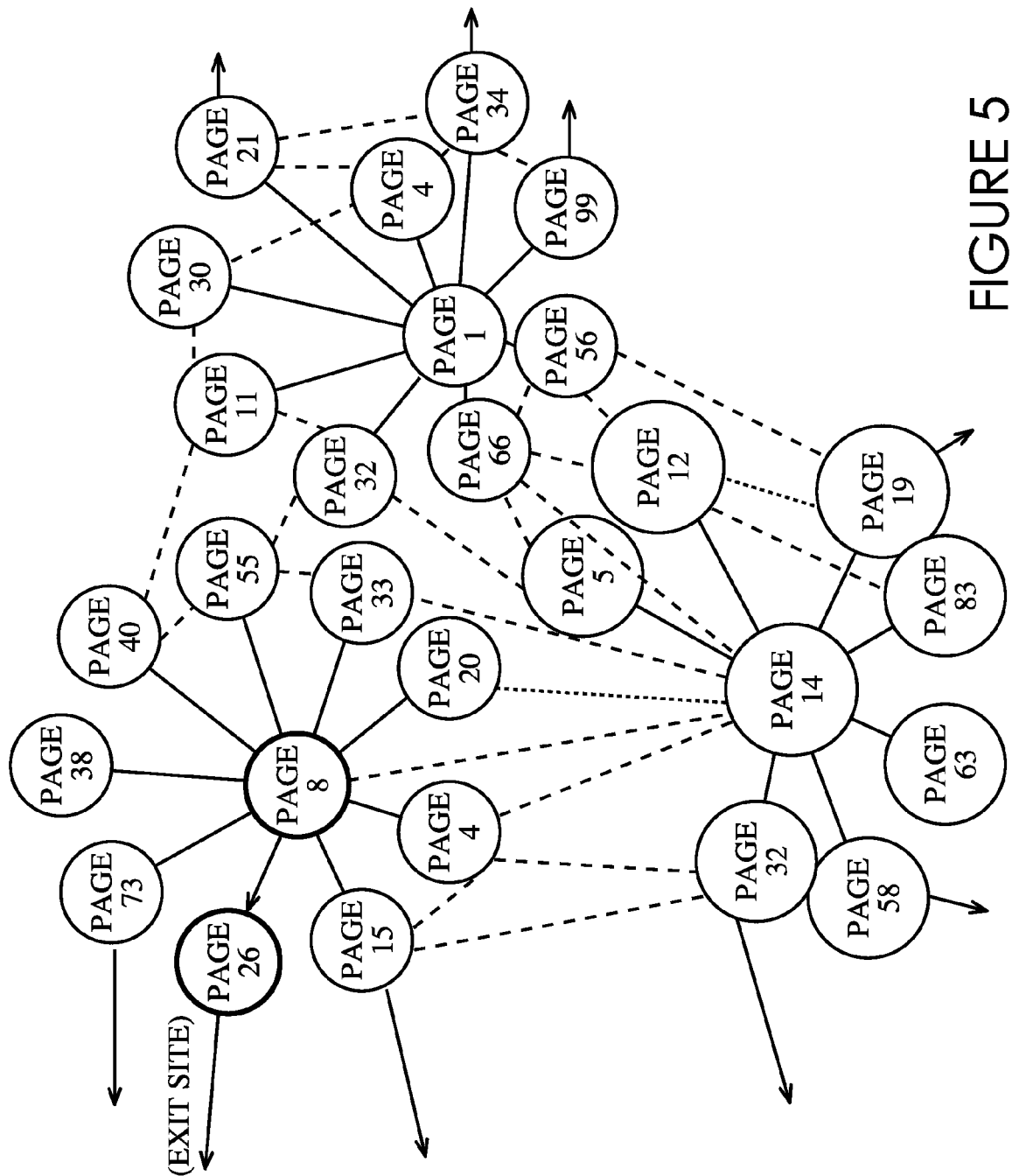
FIG. 5 illustrates qualitatively the interrelationship between various content elements of a sample web network, and the relative subsequent flow value ("SFV") of those content elements.

FIG. 5 illustrates qualitatively the interrelationship between various content elements (identified in FIG. 5 as "pages") of a sample web network 200, and the content elements' relative SFVs. In the example illustrated in FIG. 5, because SFV of a content element generally takes into account the revenue generated on all the possible subsequent pages, page 8 of FIG. 5 likely has a higher SFV than page 26, because the chances that a visit to page 8 will result in subsequent content element views within the web network are higher than the chances a visit to page 26 will result in subsequent content element views within the web network.

The first step in the method illustrated in FIG. 4 is to track and collect content data corresponding to each content element of the web network (step 402). As identified with respect to FIG. 3, one or more tracking servers 324 may perform the function of tracking the data relating to a given content element, and collecting the content data in one or more tables or logs 326. The content data may be collected by any suitable method known to one of skill in the art. For example, a static method may be implemented, such as establishing one or more data sets and using information collected for the data sets during a particular discrete time period. Alternatively, real-time or dynamic methods may be implemented, such as establishing a continuous data feed that continually renews data in the logs 326, and recalculates the values in the matrices 328 at set intervals. These intervals may be time-based.

Preferably at least two different categories of content data are collected in this step 402—traffic data and value data. Traffic data is data relating to the popularity of the various content elements in the web network, and relating to the different traffic routes users take during a visit to a web network. Each traffic route in a web network is a route taken by a user through the web network made up of one or more content elements in an order viewed by the user, beginning at an initial content element (also referred to as the "referrer" or "referring" content element) $P_{ref}$ viewed by the user in the web network and ending at the last content element viewed by the user in the web network before exiting the web network $P_{last}$. In one implementation, the traffic data includes probabilities that a user viewing a current content element $P_i$ will go directly to a subsequent (i.e., "next page") content element $P_j$ in the traffic route. These probabilities include evaluating the number of times each of the N content elements being evaluated in a web network is visited as the "next" content element directly from each of the other (N−1) content elements of the web network. These steps or jumps from a current content element $P_i$ to the next subsequent content element $P_j$ are referred to as "transitions."

The traffic data may also include values corresponding to the total number of user views for each content element in the web network in a given period of time, referred to as the "view value" of the content element. The view values, which represents the popularity of, or volume of traffic to, the respective content elements, may be represented herein by the variable, z, and may be collected, for example, on a tracking server 324 and stored in logs 326; on an analytic server 330, a web client's server or other independent or networked server (and stored as server and/or log data); or using a third party data analysis interface, such as that developed and known in the art by, for example, Omniture, Inc. of Orem, Utah; Google, Inc. of Mountain View, Calif.; Motigo of the Netherlands; or Coremetrics of San Mateo, Calif. If the view values are not available via the client's server or through a third party data analysis interface, other known means may be used, including for example tagging the content elements in a web network with a pixel (sometimes referred to as a beacon) that allows tracking and collection of such view values. Of course, even if view values are available via other means, it may still be desirable in certain instances to use a pixel or beacon in association with the present system and method, in order to obtain real-time information relating to the overall content values.

The traffic data may be collected using software developed for this purpose, as would be known and understood by one of ordinary skill in the art having the current specification, drawings and claims before them. The traffic data collection software may include constructing a square count matrix, C, (step 404) based on the transition values collected. The traffic data may be collected statically or dynamically. The count matrix C represents all the possible transitions within the web network. Each cell in the matrix preferably contains a value corresponding to the number of times users of the web network transitioned from one content element to each of the other content elements of the web network (referred to as "transition values"). Thus, each time a user transitions from a first content element $P_i$ to a next page content element $P_j$, a counter $c_{i,j}$ within the count matrix C is incremented. In one implementation, it may be determined that certain transitions are more valuable than others, and thus different increments may be assigned to different transitions. For example, if a transition from $P_a$ to $P_b$ is determined to be more valuable than a transition from $P_a$ to $P_c$, then the counter $c_{a,b}$ may be made to increase by +2 for each additional transition, while the counter $c_{a,c}$ may be made to increase by +1 for each additional transition. Similarly, it may be determined that any transition to $P_x$, is more valuable than any other transition, so the counter $c_{N,x}$ (i.e., counting the transition from any page, $P_N$ to $P_x$) may be made to increment faster than the counter corresponding to transitions from any page to any other page besides $P_x$.

FIG. 6 illustrates an example implementation of a count matrix C. As shown in FIG. 6, the rows represent the first content element $P_i$ in a transition, and the columns represent the second content element $P_j$ in a transition. Each cell represents the number of times a user transitions from a first content element $P_i$ to a second content element $P_j$. So for example, $c_{6,4}$ would equal the number of times a user transitions from content element number 6 (i.e., $P_6$) to content element number 4 (i.e., $P_4$).

Preferably, as illustrated in FIG. 6, the count matrix C includes at least one row and/or one column to represent transitions wherein a user exits the web network from a particular content element within the web network (referred to as an "exit transition"), and/or wherein a user enters a particular content element within the web network from outside of the web network (referred to as an "entry transition"). In particular, the transition values in the matrix corresponding to exit transitions indicate the number of times users exit the web network from each individual content element $P_i$ within the web network ("exit transition values"), and the transition values in the matrix corresponding to entry transitions indicate the number of times users enter the web network beginning at a particular content element $P_i$ within the web network ("entry transition values"). So for example, as shown in FIG. 6, the exit transition value at $c_{2,O}$ would be equal to the number of times a user exists the web network from content element number 2 (i.e., $P_2$). Similarly, the entry transition value at $c_{O,7}$ would be equal to the number of times a user begins his or her visit to the web network at content element number 7 (i.e., $P_7$), or in other words, the number of times the user enters the web network at content element number 7 (i.e., $P_7$) from outside of the web network.

Although only one column of exit transitions and one row of entry transitions are illustrated in the exemplary matrix of FIG. 6, it will be understood that there may be multiple exit columns and/or entry transition rows. For example, there may be three separate rows of entry transition values $c_{OA,i}$, $c_{OB,i}$, and $c_{OC,i}$, which represent entry transitions from three particular content elements or websites outside of the web network. This information is useful to a web publisher that is interested in understanding the volume of traffic from particular website. Similarly, there may be three separate columns of exit transition values $C_{i,OX}$, $c_{i,OY}$, and $c_{i,OZ}$, which represent exit transitions to three particular content elements or websites outside of the web network. This, too, is useful information to a web network publisher interested in understanding the value associated with the traffic it sends to other web networks. It should also be understood that the rows and columns may represent either the first or second content element in a transition.

In a static data collection embodiment, the information for the count matrix C may be based on transition values collected over a given discrete period of time, T, after which the matrix C would be refreshed or renewed for the next time period, T. Thus, assuming the value +1 is assigned to each counter, $c_{i,j}$ would be equal (or approximately equal) to the number of times users transitioned from element $P_i$ to content element $P_j$ during the time period, T. In a dynamic data collection embodiment, the value for $c_{i,j}$ in the count matrix C would be continually updated at certain predetermined intervals. The count matrix C may be dynamically updated using any suitable dynamic collection method known to one of skill in the art. For example, a JavaScript snippet may be inserted into every content element of the web network and run by the script engine 310 when served to the user. In one embodiment, the JavaScript snippet may take into account that the server from which the snippet is served can change. Below is an example implementation of such a JavaScript snippet:

```
<script type="text/javascript" src="http://server.com/zfa.js"></script>
<script type="text/javascript">zfa("http://server.com/zfa",
"project");</script>
```

Using the above JavaScript snippet as a representative example, each time a visitor to the web network accesses a content element within the web network, the above JavaScript snippet will request an image from the data collecting engine, and in doing so will let the tracking server 324 know that a visit has occurred, and pass along data from that visit. The tracking server 324 may then log the information relating to that visit in the data logs and tables 326. Below is a sample code for the zfa.js file referenced in the above JavaScript snippet that is responsible for collecting the information from the user's browser:

```
function zfa(logUrl, proj) {
    var ref = "";
    try { ref = top.document.referrer; }
    catch (e1) {
        if (parent) {
            try { ref = parent.document.referrer; }
            catch(e2) { ref = ""; }
        }
    }
    if (ref == "") ref = document.referrer;
    var src = logUrl+".php"+
        "?url="+escape(document.location.href)+
        "&proj="+proj+
        "&dt="+(new Date()).getTime()+
        "&title="+escape(document.title)+
        "&ref="+escape(ref);
    document.writeln("<img src=\""+src+"\"
        alt=\"ZF\" style=\"display:none\" />");
}
```

Examples of the categories of information the JavaScript snippet may request include, without limitation: the current content element $P_j$ (e.g., the URL of a web page); a project name that is given in the first JavaScript snippet; a visiting user date and time; the title of the content element currently being visited; and/or the referring content element $P_{ref}$ (e.g., the URL of a web page). Each time the tracking server 324 receives a JavaScript request for information, it may serve a static image, update the associated log(s) 326, and refresh the count matrix C. Thus, the values in the count matrix C at any given update iteration, n, may be dynamically updated based on the following equation:

$$c_{i,j}{}^n = c_{i,j}{}^{n-1}+1 \qquad \text{(Equation 4)}$$

Once the count matrix C is generated (step 404), it may be later used to generate a transition matrix Π (step 406), that is similar in structure to the count matrix C, in which transition values are stored as described above. The transition matrix Π may be thought of as a normalized version of the count matrix, C, where the value $\pi_{i,j}$ (at row i, column j in the matrix) represents the probability (rather than the count, or number of times) that a user will transition from content element $P_i$ to content element $P_j$. Similarly, $\pi_{i,O}$ represents the probability a user will exit the web network from $P_i$ (in the case where all exit transitions are grouped into a single, abstract exit point). These values $\pi_{i,j}$ (or $\pi_{i,O}$) may be referred to as "transition probabilities." Based on this normalization model, each value $\pi_{i,j}$ in the matrix may be calculated as follows:

$$\pi_{i,j}=c_{i,j}/(c_{i,1}+c_{i,2}+c_{i,3}+\ldots+c_{i,N}) \qquad \text{(Equation 5)}$$

As with the count matrix C, the transition matrix Π may be statically maintained and only updated periodically, or it may be updated dynamically in real time as new users visit the web network. In order to dynamically update the transition matrix Π as efficiently as possible, one of skill in the art would understand that a cache with the sum of each row of the count matrix C (effectively the number of visitors to each page, independently of the jumps) may be stored and used to renormalize the transition matrix Π as quickly as possible. Thus, in a dynamic collection embodiment, the transition probabilities $\pi_{i,j}$ in a transition matrix Π may be continually updated based on the most currently updated count matrix C.

Returning to step 402, in addition to collecting traffic data, the step of collecting content data may also include collecting value data used to determine the revenue value R of each content element, as explained below. Value data is data relating to how commercially and/or strategically valuable a given content element is, and thus value data may be based on various revenue based and non-revenue based parameters. Examples of revenue based parameters include brand value; asset value (such as asset value relating to a single corporate entity, and/or asset value relating to a plurality of related entities as a whole); product launch contribution; pricing information and marketing revenue information (such as advertising revenue, affiliate marketing revenue information, sponsorship revenue information, content licensing cost information, e-commerce transaction revenue information); and the like. Examples of non-revenue based parameters include the number of subscriptions, the number of registrations, the number of memberships, the total number of transactions on the web site or network of sites, the number of transactions by a defined third party on the web site or network of sites, number of offline transactions, perceived strategic value, information value contained in the content element, number of red pixels, and the like. It is also contemplated that the value data may be offset by a fixed or other predetermined value to intentionally skew the analysis to give certain content a more significant value toward giving the content a more prominent position in the overall web site 200. Since it is possible for gathered value data for some content to be zero and, as such resulting value data may be equal to the manually fixed value.

Value data may be collected either statically or dynamically. In one example implementation of static collection of value data, the ad server 320 may offer certain pricing information from the publisher of the web network, including the current ad pricing model being used, rate or price at which content elements or goods/services are sold, sell out rates, and/or other information as to the publisher's pricing models and strategies. For example, for ad-based revenue, the value data collected may include, for example, the price at which ad-space is sold for certain types of ads, for groups or categories of content elements in a web network, for the web network as a whole, or for any combination of the foregoing; and/or the sellout rate. For retail-based revenue (e.g., sale of products or services), the price of the goods and/or services being sold may be collected.

In one example implementation of dynamic collection of value data, the ad server 320 may include an ad pricing interface, such as a DART® server, which is able to continually report dynamically changing prices and values assigned to each content element of the web network from the web network publisher, and update the value data at the data analysis interface in real time. For example, a web network publisher may have a sophisticated and/or proprietary strategy for pricing the advertisements, goods or services it sells, based on a plurality of variables, and thus the prices are likely to change over time. For each content element in the web network, the data analysis interface would determine, for example, the price or rate $r_i$ at which the advertisements, goods or services at content element $P_i$ are being sold. If this rate $r_i$ changes with time, then for each time t, a real-time version of a revenue value as a function of a time R(t) may be generated for each content element. This time-dependent revenue value R(t) may then be used to determine the next value iteration for the overall content value, as discussed in greater detail below.

Once the value data is collected, that value data may then be used to determine a revenue value, R, corresponding to each content element (step 408). In one implementation, the revenue values are calculated in the analytic server based on the content data. Alternatively, the revenue values may be calculated by another server, such as the tracking server, or it may be determined manually by the publisher, and then provided to the analytic server. Preferably a revenue value R is determined for each content element P of the web network. Alternatively, one revenue value may be assigned to a group or category of content elements.

Each content element may include a number of different revenue-generating components, as illustrated in FIG. 1. Moreover, any given content element may have different types or categories of revenue-generating components. For example, certain revenue-generating components may contribute actual revenue generated (or estimated to be generated) to the revenue value R, such as revenue from banner, video, search and other ads on the content element. One of skill in the art would understand that such direct revenue associated with a content element can be generated in a number of different ways. For example, an e-commerce web site may generate revenue through the sale of products or services. In this case, each content element in the web network may be attributed a value (i.e., an overall content value) based on that content element's role in driving users to an ultimate purchase of goods or services. In addition or alternatively, revenue may be generated from advertisements using a number of different advertisement models known in the industry, such as, for example and without limitation, cost per thousand impressions (CPM), cost-per-click (CPC), or cost per action (CPA). Where a revenue-generating component includes advertising value equal to the cost per thousand impressions, the revenue contributed by such advertisement would be equal to the sell out rate (i.e., percent of content element views sold) per thousand views of the content element.

Certain revenue-generating components may alternatively or additionally contribute subjective value to the revenue value R. Such subjective value may not come entirely from direct revenue, but rather in whole or in part from subjective strategic value such as, for example and without limitation, brand recognition, novelty, asset valuation, asset creation valuation, helping build awareness of a new product, or helping to generate subscriptions or registrations to the web network. Any number of factors may contribute to (or take away from) the subjective value of a content element of a web network, including, by way of example only and without limitation, the number of times a predetermined word or phrase is used; the news worthiness or "news buzz" value; the season of the year in relation to the goods being sold; a measure of relevance of the ads with respect to the content of the page, prestige or good will associated with goods or brands being displayed, graph theoretic measures of connectedness to other pages in the network, content relevance, click volatility and the like.

In one implementation, an objective numeric value may be calculated, determined or assigned to such subjectively valued revenue-generating components of a content element so as to correspond to any such subjective strategic value contributed by the particular content element. Such objective numeric value corresponding to a subjectively valued revenue-generating component may be determine or assigned, for example, based on a pre-determined priority and/or by using different predetermined rationales for the level of objective value assigned to each such content element. Further, these objective numeric values may be updated or changed over time. These objective numeric values may then be normalized, or otherwise expressed in such a way so as to be compatible or consistent with the values corresponding to the direct revenue-generating components having actual (or estimated) revenues. For example, the objective numeric values may be normalized to represent dollars (or other currency), RPM, or some other suitable unit of revenue or value measurement. One of skill in the art having the present specification, drawings and claims before them would understand that the determination of an objective numeric value associated with a subjective strategic value, as well as the normalization of such objective numeric values to result in relative objective values, may be accomplished be means and/or methods known in the art.

Where the revenue value of a content element includes (1) direct revenue of different types or formats; (2) direct revenue generated using different types of business models (e.g., cost per thousand impression (CPM) vs. cost per click (CPC) vs. cost per action (CPA)); and/or (3) subjective strategic value that is assigned a relative objective value, the total revenue value R of the content element may be determined by summing up the calculated and/or assigned values for each revenue-generating component on the content element, as set forth in Equation 1. It will be understood by a person of ordinary skill in the art having this specification before them that other factors may potentially affect the revenue value of a content element or web network. For example, there may be variable costs incurred when a user visits a content element, such as a video for which a publisher is required to pay a copyright license each time it is viewed. These, and other costs may be added as a negative component of R (i.e., subtracted from the total R).

Returning to FIG. 4, the next step in the process is to calculate the overall content value v for each content element and/or group of content elements, based on the revenue value R and the content data (step 410). In calculating the overall content value v (step 410), Equation 3 may be further expressed in terms of the following value function, which approximates the present discounted value (PDV) of current and expected "future" revenue (i.e., SFV) for content element, $P_i$:

$$v_i = R_i + \beta \Sigma_{j=1}^{N} \pi_{i,j} v_j \quad \text{(Equation 6);}$$

with $$\beta = 1/(1+r) \quad \text{(Equation 7);}$$

where $\beta$ is a constant, r represents the cost of capital over a relevant predetermined time interval; $\pi_{i,j}$ is the probability of a transition from $P_i$ to $P_j$, N is the number of content elements to be analyzed in the web network, i represents the current content element, and j represents the "next page" content element (i.e., content elements "reachable" directly from $P_i$). In Equation 6, the expression of $(\beta \Sigma_{j=1}^{N} \pi_{i,j} v_j)$ represents a SFV for $v_i$.

In Equation 7, the relevant time period is preferably relatively small. Thus, the value for the constant, $\beta$, will be a number close to, but smaller than, one. In particular, $\beta$ preferably falls between the interval [0,1], is indicative of how quickly new information is taken into account when determining the overall content value according to Equation 6, and can help in the convergence of Equation 6 which represents the SFV in an iterative algorithm. In one example implementation, the value for $\beta$ is equal to 0.85, and thus r would be approximately 0.176.

Equation 6 can also be written in matrix notation form as follows:

$$\overline{V} = \overline{R} + \beta \Pi \overline{V} \quad \text{(Equation 8)}$$

where $\overline{V}$ is a N×1 matrix (or a transposed vector) equal to $\{v_1, v_2, v_3, \ldots v_N\}$; $\overline{R}$ is a N×1 matrix equal to $\{R_1, R_2, R_3, \ldots R_N\}$; $\Pi$ is a matrix of transition probabilities; and $\beta\Pi\overline{V}$ is a matrix representing SFVs for $\overline{V}$. Solving Equation 8 for $\overline{V}$ gives the following equation:

$$\overline{V} = (I - \beta\Pi)^{-1} \overline{R} \quad \text{(Equation 9)}$$

where "I" denotes the identity matrix. In some circumstances, it may be impractical to invert the matrix $(I-\beta\Pi)$ especially due to the processing power that may be required to invert the matrix and/or the singularity (or near singularity) of the matrix. Thus, in one example implementation, the inversion of matrix $(I=\beta\Pi)$ may be approximated by value iteration over an initial assignment of overall content values (represented by a matrix, $\overline{V}_0$) by, for example, repeatedly calculating the matrix $\overline{V}$ using the following formula:

$$\overline{V}_{k+1} = \overline{R} + \beta\Pi\overline{V}_k \quad \text{(Equation 10).}$$

wherein $\overline{V}_{k+1}$ is a N×1 matrix of the overall content values for the content elements being analyzed for the (k+1)-th iteration; $\beta=1/(1+r)$; r represents the cost of capital over a relevant predetermined time interval; $\Pi$ is a matrix of transition probabilities and $\overline{V}_k$ is a N×1 matrix of the overall content values for the content elements being analyzed for the k-th iteration. The expression $\beta\Pi\overline{V}_k$ represents a matrix of SFVs for $\overline{V}_{k+1}$ after the k-th iteration. Other techniques for approximating the value of an inverted matrix may be known and used in the present system and method.

Figure 7:
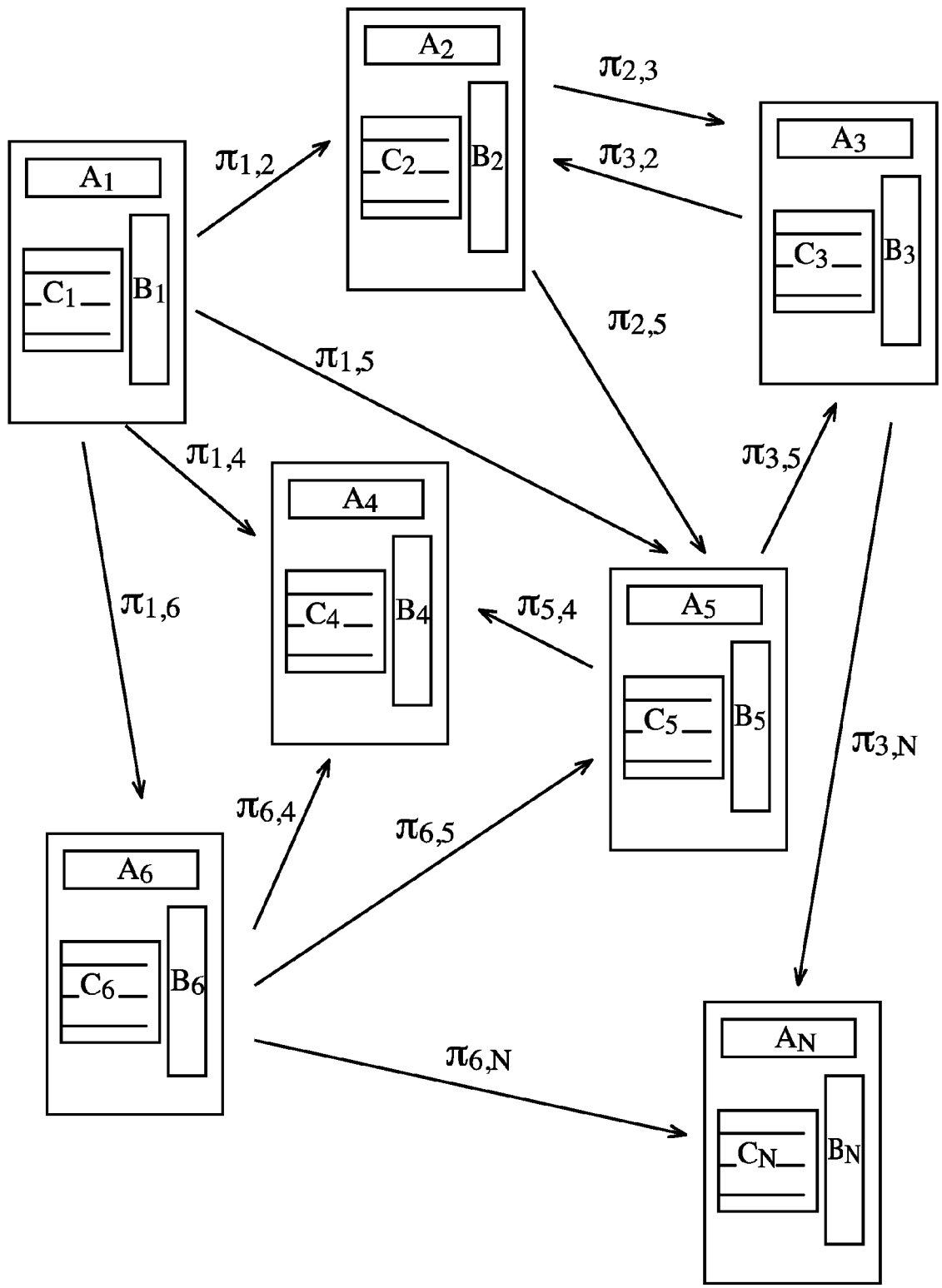
FIG. 7 illustrates an example of a simplified web network with a plurality of interconnected content elements and showing next page transitions between the content element.

FIG. 7 illustrates a schematic diagram qualitatively depicting the approach described above. In particular, illustrated is an example of a simplified web network with a plurality of interconnected content elements $P_i$. Each arrow between the content elements $P_i$ represents a transition probability $\pi_{i,j}$ from one content element $P_i$ to the next content element $P_j$. For each such transition, there is associated with it a probability that such transition will take place during any given user's visit to the web network. And it is these probabilities that make up the transition matrix, $\Pi$, which is input into the matrix-form value function of Equation 8 to determine the overall content values v for each content element.

Figure 8:
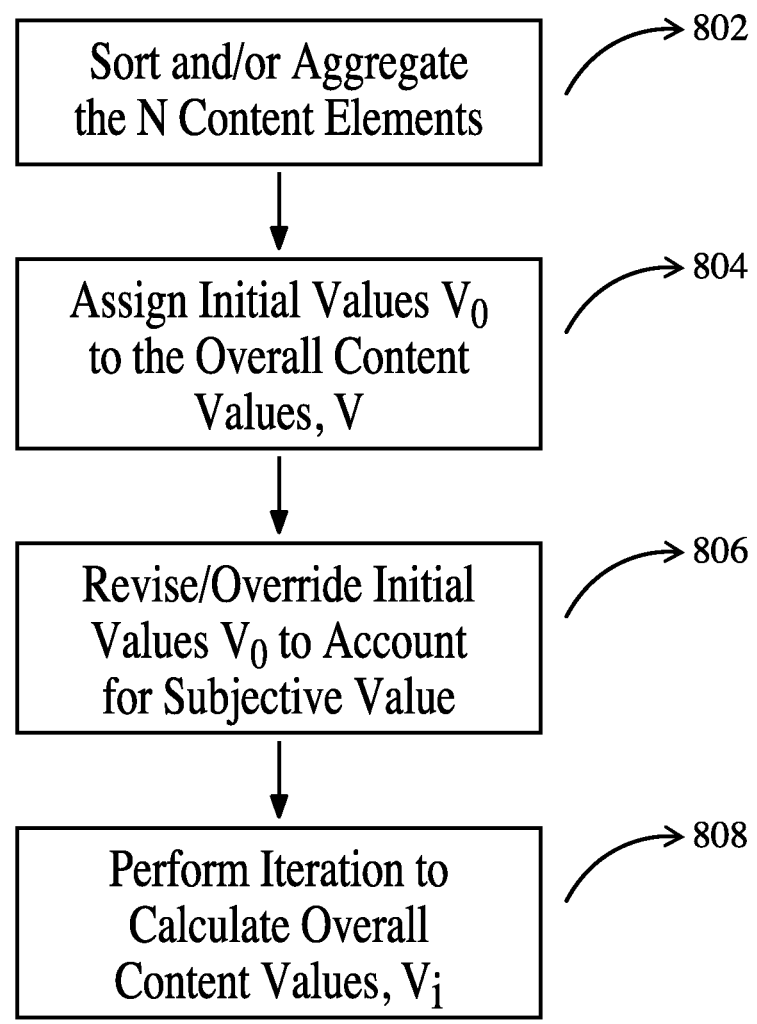
FIG. 8 illustrates one example implementation of a method for calculating the overall content value for a content element among N content elements in a web network.

FIG. 8 illustrates one example implementation of a method for calculating the overall content value $v_i$ for a content element $P_i$ among N content elements in a web network. The steps described in FIG. 8 preferably occur in one or more analytic servers 330. First the N content elements may be sorted and/or aggregated (step 802) using any suitable sorting and/or aggregating function known to one of skill in the art having the present specification, drawings and claims before them. For example, one such person of skill would understand that a lexicographic order over the URLs may be used to sort and/or aggregate the content elements. As another example, any suitable known sorting and/or aggregation software may be used, such as various known software applications provided by Microsoft Corporation of Redmond, Wash. ("Excel"); SAS of Cary, N.C.; SPSS of Chicago, Ill.; Oracle of Redwood Shores, Calif.; StataCorp LP of College Station, Tex. ("Stata"); The MathWorks of Natick, Mass. ("Matlab"); and Software Productivity Strategists, Inc. of Rockville, Md. ("SPS"); as well as Python-based and Project R-based open source software. The sorted and/or aggregated content elements may be stored and later used in the form of a table, vector or matrix. The resulting aggregation of the N content elements resulting from this step 802 may be preserved throughout the remaining steps described below, or may be updated as desired.

One advantage of the sorting and/or aggregating step 802 is to help ensure that there are no duplicate content elements in the table, vector or matrix so that each content element is analyzed only once. In addition to aggregating identical duplicates, it may be desirable to aggregate substantially similar content elements based on, for example, a word distance measure, in such a way that the content elements below a certain distance are considered identical. In one preferred implementation, the Levenshtein distance may be used for this purpose. The Levenshtein distance is a metric for measuring the amount of difference between two sequences (sometimes referred to as the edit distance). In particular, the Levenshtein distance dL between two strings, u1 and u2, is defined as the minimum number of edits (insertions, deletions, substitutions and transpositions) that need to be performed to convert u1 into u2. For example:

1. dL(obama, omaha)=2
   obama→obaha→omaha
2. dL(www.yahoo.com,www.google.com)=6
   www.yahoo.com→www.yohao.com→www.yooah.com→www.gooah.com→www.googh.com→www.googl.com→www.google.com In one example implementation, an iterative algorithm is used to calculate the overall content value, $v_i$, of a content element, $P_i$. In such an implementation, once the content elements are sorted and/or aggregated (step 802), an initial overall content value, $v_i(0)$, is assigned to the i-th content element. The initial assigned values for the N×1 matrix, $\overline{V}=\{v_1, v_2, v_3, \ldots v_N\}$ may be expressed by the N×1 matrix $\overline{V}_0=\{v_1(0), v_2(0), v_3(0), \ldots v_N(0)\}$. The assigned value may be a random assignment such that $\overline{V}_0$ is a random N×1 matrix. However, beginning with a random matrix may result in a less efficient algorithm, and/or less accurate solution. Thus, alternatively, depending on how much is known about the solution that is sought, one of skill in the art would understand that the domain from where the initially assigned values are drawn may be restricted to make the iterative algorithm more efficient. In the case of solving for the overall content value of the i-th content element, $v_i$, one of skill in the art may use the revenue value of the content element $R_1$ as a starting point for $v_i(0)$. This results in the following N×1 matrix, $\overline{V}_0$:

$$\overline{V}_0 = \overline{R} = \{R_1, R_2, R_3, \ldots, R_N\}.$$

In addition, or alternatively, this assignment step 804 may include simply assigning to $\overline{V}_0$ the prices at which content elements are commonly sold.

Next, the initial values $\overline{V}_0$ assigned for the initial iteration of the overall content values may be revised and/or overridden to account for subjective strategic values (step 806) if the initial values $\overline{V}_0$ had not already taken such subject strategic values into account, such as discussed above with respect to FIG. 4. Thus, if the initial assigned values $\overline{V}_0$ only reflected direct revenue or price information, for example, the initial assigned values g that were assigned to each content element can be modified to reflect other immeasurable, or less measurable, subjective value (such as brand recognition or novelty value), resulting in a more accurate initial value for the iterative algorithm, and thus a more efficient iteration. As previously explained, objective numeric values based on the subjective strategic values may be determined or assigned, and then normalized, or otherwise expressed in a way compatible or consistent with the actual (or estimated) revenues of that content element.

The iteration is then performed over Equation 10 (step 808): $\overline{V}_{k+1} = \overline{R} + \beta \Pi \overline{V}_k$. As previously noted, β preferably falls between the interval [0,1], is indicative of how quickly new information is taken into account when determining the overall content value according to Equation 6, and can help in the convergence of the summation portion of Equation 6, which represents the SFV. In one example implementation, after each iteration, the difference between $\overline{V}_k$ and $\overline{V}_{k+1}$ is measured:

$$\partial = \|\overline{V}_{k+1} - \overline{V}_k\|. \qquad \text{(Equation 11)}.$$

Preferably, the iteration step continues until $\partial$ is below a certain predetermined threshold. In one example implementation, the predetermined threshold is $10^{-3}$, and it has been found that this particular predetermined threshold may generally be reached after approximately 10 iterations.

Returning to the method of FIG. 4, once the overall content values v are calculated (step 410), certain of the overall content values may optionally then be filtered out or otherwise overridden from the results (step 412) by a filter module 332 as discussed in association with FIG. 3 above, resulting in a set of overall content values to be analyzed. Once the set of overall content values to be analyzed is determined, various results may be generated (step 414) for use in evaluating and analyzing the results toward optimizing traffic in the web network, so as to maximize the revenue generated by the web network. For example, the step 414 of generating results may include creating various charts, tables, graphs and other reports (collectively, "reports"), and/or making various calculations relating to the relationship between certain content data and the SFVs or overall content values.

Hard copies and/or electronic copies of the results may then be provided or communicated to a web publisher, client or other entity via any known suitable forms of communications (step 416), who may then receive the results for review and evaluation (step 418). Alternatively, the overall content values themselves may be communicated directly to a third party (step 416) without generating any reports, calculations or other results, so that the third party can generate its own reports/calculations. And as another alternative, in some circumstances, website traffic may be optimized based on the overall content values (step 418) without having generated any calculations or reports.

It is an advantage of the inventive method that every content element can be assessed as part of the equilibrium that is the web network, playing a role in managing the flow of the traffic through that equilibrium. The overall content value of each content element may thus be affected by its ability to make traffic flow through the web network, such as by making it flow to the content elements with the highest overall content value of the web network (e.g., the content elements where a lot of revenue is generated).

Accordingly, the calculations and reports generated at step 414 allow the publisher of the web network to review, analyze, compare and otherwise evaluate the overall content values for each of the content elements relative to certain of the content data, and based on the reports and calculations, the publisher of the web network can develop, modify, revise, arrange, or configure the web network in such a way as to optimize the internet traffic flow through the web network to maximize the revenue generated by the web network (step 418). The web network may be modified in a number ways, including, for example and without limitation, embedding links to other content elements and/or adding additional revenue generating elements in the form of advertising, sponsorships, transaction opportunities and the like to the content element, or including elements and content promotion, such as inbound linking, search engine marketing/optimization, syndication, internal and external advertising and the like.

Figure 10:
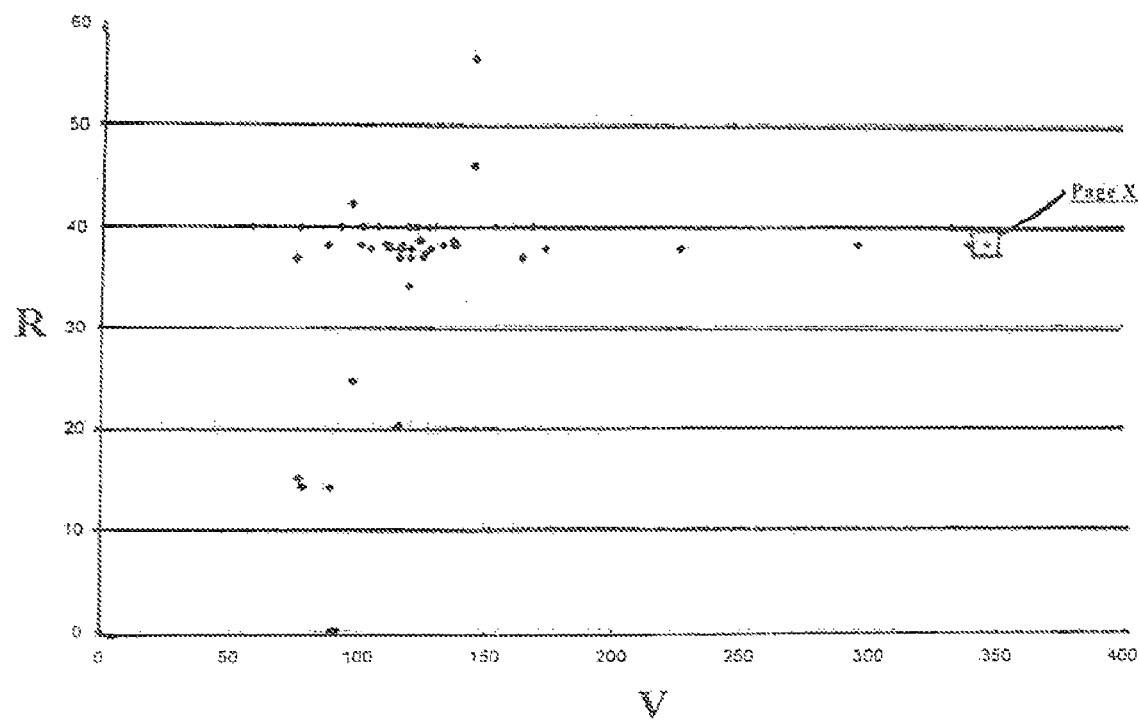
FIG. 10 is a scatter plot illustrating overall content values versus revenue values, for a representative example of a web network.
Figure 11:
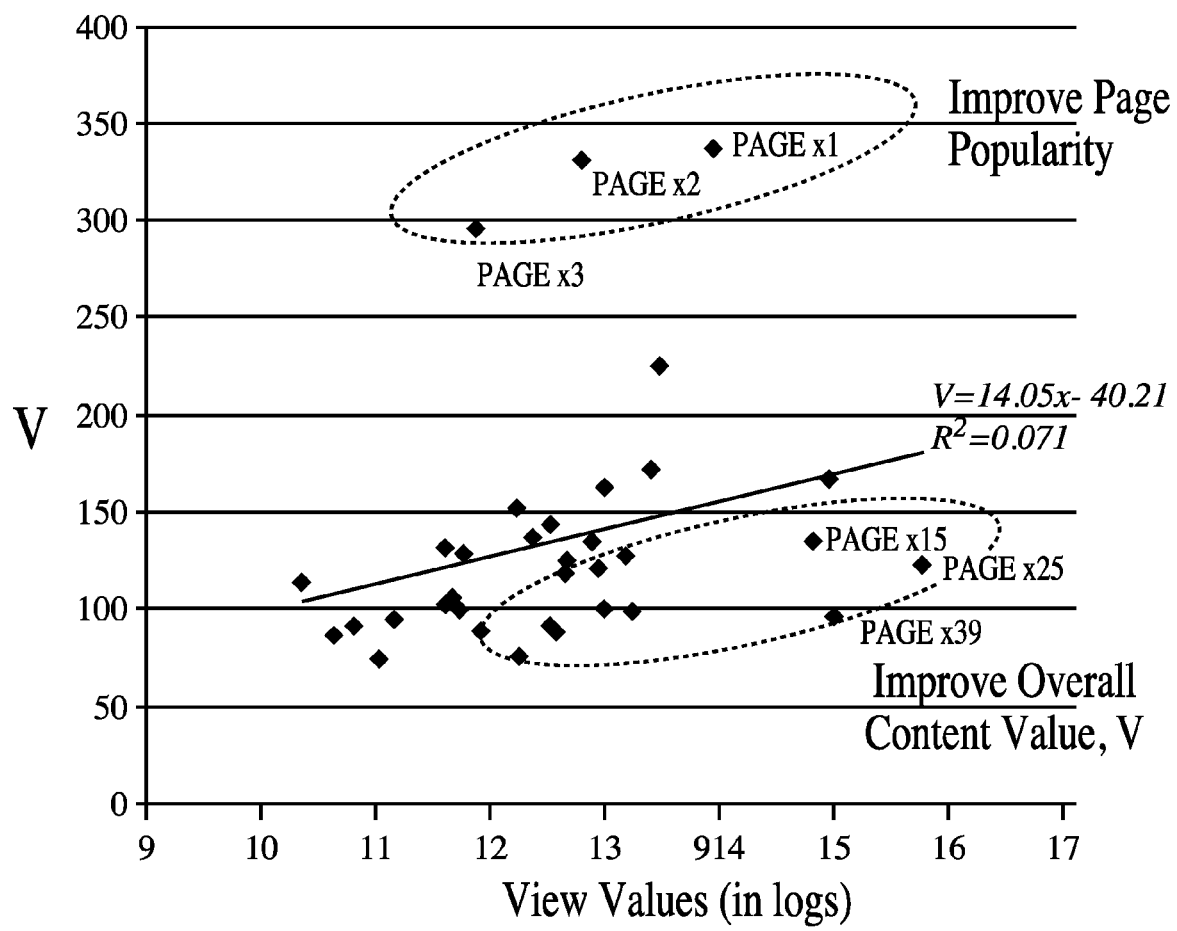
FIG. 11 illustrates an example of a correlation between overall content value and web network traffic.

Examples of various reports, graphs and other results that can be generated (step 414) using the content data and/or the overall content values v of each of the content elements in the web network, are illustrated in FIGS. 9-11. However, one of skill in the art having the present specification before them would understand that other results may be generated in step 414, other than what is specifically set forth in FIGS. 9-11 as illustrative examples. For example, a report indicating how valuable a particular group or category of content elements is relative to the overall web network, such as by way of a heat map showing the value that such particular group or category contributes in terms of their overall content values. Also, reports may be generated that provide trend information showing how the value of a content element, group of content elements, web site or group of web sites is improving over time. This may be done, for example, by plotting a correlation coefficient ($r^2$ as discussed below) over time.

In addition, the overall content values of each content element may allow a web network publisher to then calculate a return value reflecting the increase (or decrease) in value arising out of particular marketing, advertising and/or promotional programs (individually and collectively referred to as a "marketing program") or other modification of the web network. For example, the internal rate of return (IRR) for any such marketing program may be determined, such that the overall content value $v_i$ corresponding to the marketing program in Equation 6 equals the cost of the marketing program. This results in a zero net value for the marketing program, and the resulting IRR that is calculated is based on sending an additional user to that content element.

The internal rate of return, IRR, for the i-th content element, which as explained above is based on an overall content value, $v_i$, may be calculated by solving for $IRR_i$ in the following equation:

$$v_i = \text{Cost} = R_i + \frac{1}{1\_IRR_i} \sum_{j=1}^{N} \pi_{i,j} v_j \quad \text{(Equation 12)}$$

which results in the following equation for IRR:

$$IRR = \frac{\sum_{j=1}^{N} \pi_{i,j} v_j}{\text{Cost} - R_i} - 1, \quad \text{(Equation 13)}$$

where "Cost" is equal to the cost of the particular marketing program, making the marketing program a zero net value program.

Knowing the IRR for one or more such marketing programs, the publisher may then work to develop marketing programs that are effective in driving traffic to the most valuable pages of the web network, for example by buying search keywords, or by serving various online advertisements. The IRR calculation will help the web network publisher to determine, for example, whether the increase in traffic arising out of the particular marketing program is worth the cost of the marketing program. Thus, in this example, in the case of a sufficiently high IRR, the publisher may decide the traffic gained through the marketing program is worth the cost, while in the case of a low or negative IRR the publisher may decide to eliminate or modify the marketing program to increase the IRR.

It will be understood by one of skill in the art having the current disclosure before them, that calculating IRR based on the overall content value is only one example of a tool for determining whether to participate or implement (or how best to implement or structure) a particular marketing program. For example, the return value may be the return on investment ("ROI") associated with a marketing program or other web network modification.

FIG. 9A illustrates a sample report in table format listing the overall content values for sixty-five interlinked content elements in a web network where N=65. In the table in FIG. 9A, the overall content values are ranked from highest to lowest. Alternatively, or in addition, to the table ranking of FIG. 9A, a similar table may be generated as shown in FIG. 9B wherein the content elements are ranked based on number of page views (i.e., view values, z). Ranking the overall content values in either of these manners can give the web publisher a visual indication, in report form, of which content elements are either the most valuable in terms of their ability to generate revenue for the web network as a whole, and/or are the most popular in terms of view values. It is generally desirable for the content elements with the highest value for v to have the most internet traffic, and the content elements with the least amount of traffic to have the lowest overall content values. Thus the rankings can help the publisher of a web network determine, for example, which content elements to promote, e.g., through internal "on air promotions" (each promotion being a content element) through search marketing, advertising, links to other content elements and the like, so as to increase traffic to the content elements with the highest overall content values.

FIG. 10 is a scatter plot illustrating overall content values v along the x-axis, versus revenue values R along the y-axis, for a representative sample web network. A scatter plot is a helpful tool in determining the strength of the relationship between two variables. This scatter plot is another report that provides information that may be useful in evaluating and optimizing traffic flow throughout the web network. Often, web network publishers try to optimize traffic flow by sending as much traffic as possible to the content elements with the highest present revenue value, R. This strategy, however, may over-simplify the situation as it does not take subsequent traffic flow by a user into account. Content elements that may seem to have low value because the present revenue value, R is low, may actually be highly valuable when taking the subsequent traffic flow from that content element into account.

Ultimately, to maximize the revenue for a web network, it is desirable to direct traffic to the content elements with the largest overall content value. These are not necessarily the web pages that generate the most revenue or even that have the most subjective strategic value, because the web network's ability to generate revenue is also affected by the probability that users stay in the web network after they have seen a particular content element. For example, assume "Page X" in FIG. 10 is a blog page that carries little advertising, but is very good at driving traffic to other valuable pages within the web network. In this example, Page X alone only has a revenue value, R, equal to approximately $38,000, yet the overall content value of Page X is approximately $350,000. This type of information is useful in deciding how to design, develop or configure a web network.

One way to optimize the traffic flow so as to maximize the overall value of a web network is to configure the web network so as to maximize the correlation between the overall content values v for the content elements within the web network on the one hand, and the traffic to the respective content elements (i.e., the view values) on the other hand. This may be accomplished by generating as many page views as possible for the content elements with the highest overall content value. Accordingly, the step 414 of generating various calculations and reports may include calculating a correlation between the overall content values and the view values.

The strength of the linear association between two variables x and y may be quantified by a correlation coefficient corr(x,y). As would be understood by one of skill in the art having the present specification, drawings and claims before them, given a set of variables, $\{(x1, y1), (x2, y2), \ldots (xn, yn)\}$, the correlation coefficient corr(x,y) may be mathematically defined as:

$$\frac{cov(x, y)}{\sigma(x)\sigma(y)} \quad \text{(Equation 14)}$$

where cov(x,y) denotes the covariance between two random variable x and y, σ(x) denotes the standard deviation of x, and σ(y) denotes the standard deviation of y. As would also be understood by one of skill in the art, the square of the correlation coefficient, $corr^2(x,y)$ (often referred to as $r^2$ where there is no constant in the linear regression), is a useful value in linear regression, where the closer $r^2$ is to 1, the greater the correlation. In connection with the present invention, $r^2$ is preferably greater than 0.5. Once the relevant content data (e.g., view values) is collected, and the overall content values v are determined, the square of the correlation between them, $r^2$, may be easily calculated using any software program known in the art to accomplish such a calculation.

FIG. 11 illustrates an example of a correlation between overall content value and web network traffic (i.e., view values). In particular, in FIG. 11, the overall content values v for several content elements identified in the table at FIG. 11 are plotted against the respective view values, and a regression line for the correlation between overall content values v and view values is shown. It should be noted that for ease of explanation, only a portion of the content elements are represented in the plot of FIG. 11.

In the example of FIG. 11, $r^2$ is low ($r^2$=0.071), indicating that the correlation between overall content values v and view value is low. The low correlation can be qualitatively seen by looking at certain specific pages. For example, looking at pages x1, x2 and x3, for example, these pages have a relatively high overall content value, v. However, their respective page views are relatively low given their high v value. This would indicate to the publisher of the web network that these high-valued pages should be promoted more so as to increase the traffic they receive. Similarly, looking at pages x15, x25 and x39, these pages have relatively high traffic compared to their overall content values v. This indicates to the web network owner or developer that their overall content value should be increased. Using the reports and calculations based on the overall content values and other content data, such as described with respect to FIGS. 9-11, a web network publisher may take certain actions to optimize (e.g., improve the overall value of) the web network (step 418). For example, the publisher may start by identifying the content elements that are the biggest outliers affecting the correlation, (i.e., the points that are furthest removed from the regression line in the correlation plot, such as pages x1, x2, x3, x15, x25, x39 of FIG. 11), and then configuring the web network in such a way as to bring these points closer to the regression line. This would include reconfiguring the web network so as to increase v for content elements with low v compared to popularity (i.e., traffic or view values), and increasing the popularity of content elements with low view values compared to overall content value v. As explained, at least two types of imbalance exist that may lower the correlation $r^2$—(1) the content element's overall content value is low given its number of views (view value), and (2) the content element's view value is low given its overall content value. Traffic through a web network can be optimized by improving both types of imbalance. For the first type of imbalance, where a content element's overall content value is low given the view value, the overall content value of that content element may be improved by, for example, embedding links to other content elements in the web network having high overall content values and/or adding additional revenue generating elements to the content element, in the form of among others: advertising, sponsorships, transaction opportunities and the like. One of skill in the art having the present specification, drawings and claims before them would understand that any other method known in web development and advertising may be used to divert traffic to desired content elements or groups of content elements, and to increase revenue generated on any given content element.

For the second type of imbalance, where a content element's view value is low given its overall content value, the content element's view value may be increased in a number of ways, including without limitation: content promotion, inbound linking, search engine marketing/optimization, syndication, internal and external advertising, and the like. One of skill in the art having the present specification, drawings and claims before them would understand that any other method known in web development and advertising may be used to increase view values. One advantage of the invention is that a web network publisher that knows the overall content value of a particular content element may then be able to pinpoint the IRR associated specifically with the advertisements, promotions, or other activities designed to drive traffic to that particular content element.

One advantage of the invention, is that once an overall content value v is known, the web network publisher can use that value to determine how much money can be spent on promoting the various content elements, to maintain the desired IRR. So for example, in one implementation, the step of optimizing preferably includes balancing one or more overall content elements (and/or the overall revenue generated by, or estimated to be generated by, the entire web network or a portion thereof) versus the costs associated with the content element(s) (or with generating such overall web network revenue). Thus, the overall content values v may be used to determine an appropriate spending budget for certain marketing strategies, including amounts spent for keywords such as in search keyword bidding system.

The overall content values may also be used to evaluate the economic value of a particular marketing or sponsorship strategy or model, such as a particular partnership, or to the impact a certain content modification may have on the publisher's overall IRR. For example, if a publisher desires to purchase a particular search engine keyword in order to drive traffic to a particular content element, the publisher will be able to determine the maximum bid that can be made on that search engine keyword in order to maintain a desired IRR on that search engine keyword, and may then use this information in automatic search keyword bidding tools to set upper bounds to its keyword bids.

In one application of the disclosed system and method, the determined overall content values may be used in connection with A/B testing (also referred to as "split testing"). Generally, A/B testing is a testing method in which two random groups of web site visitors are served different pages to test the performance of specific content elements, such as for example, headline or graphic elements. Results of the testing can help to track changes in behavior of prospective customers based on which version of the web page they viewed. In connection with the present invention, an overall content value for each of two different versions of a content element can be determined, and based on the outcome, it can be decided which version (i.e., version A or version B) is more valuable. The overall content values v(A) and v(B) can be compared, as can their respective return values, e.g., IRR(A) and IRR(B). It should be understood that more than two versions of the content element can be compared using this A/B testing method in connection with the invention.

Returning to step 418 of FIG. 4, the optimizing step may be automated, such as by use of software for this purpose. For example, software for automatically optimizing a website as described herein can be accomplished using a variety of known formal mathematically-based methods (also referred to simply as "formal" methods), including, for example, simulated annealing, conjugate gradients and expectation maximization. These formal methods may take into account the gradient associated with a change in the overall content value of a content element, $\Delta v_i$, when modification are made to the content element or the web network. Typically, implementation of formal methods of optimization may involve making one or more arbitrary or random modifications to a content element or web network, such as on a trial and error basis, and there generally is no guarantee that such random changes will result in an increase of the overall content value of the content element in question. Thus, in addition, or in the alternative, to formal methods of optimization, heuristic methods may be used. Heuristic methods may be desirable in situations where, for example, it is unfeasible, impractical or undesirable to modify the content element or web network arbitrarily, such as by trial and error, for the purpose of finding the direction of the gradient $\Delta v_i$.

With a heuristic approach, automated optimization may be based on expectations that a particular action will result in an increase in $v_i$. For example, content elements with high overall page value but low traffic may be interconnected with content elements with high traffic. It is generally expected that this approach would enhance the traffic of the former, while modifying little of the traffic pattern of the latter. Other heuristic-based changes can be made to a web network, resulting in steps toward moving the web network closer to a desired optimization, even if such steps are not guaranteed to reach the optimal solution. This collection of methods is often referred to as a myopic search. In one implementation, a hybrid of the two types of approaches (mathematical and heuristic), where a virtual website (with virtual random walk visitors) is modified using heuristics, and the solution is then evaluated using virtual visitors walking randomly over the graph following links based on the transition matrix or other content data. Once the virtual website is evaluated, the optimization can then be guided by one or more mathematical methods.

Methods or processes in accordance with the various embodiments of the invention may be implemented by computer readable instructions stored in any media that is readable and executable by a computer system. A machine-readable medium having stored thereon instructions, which when executed by a set of processors, may cause the set of processors to perform the methods of the invention. A machine-readable medium may include any mechanism for storing or transmitting information in a form readable by a machine (e.g., a computer). A machine-readable medium may include read only memory (ROM); random access memory (RAM); magnetic disk storage media; optical storage media; or flash memory devices. Different known types of software may be used, as one of skill in the art having the present drawings, specifications, and claims before them would understand.

The foregoing description and drawings merely explain and illustrate the invention and the invention is not limited thereto. While the specification in this invention is described in relation to certain implementation or embodiments, many details are set forth for the purpose of illustration. Thus, the foregoing merely illustrates the principles of the invention. For example, the invention may have other specific forms without departing from its spirit or essential characteristic. The described arrangements are illustrative and not restrictive. To those skilled in the art having the present drawings, specifications, and claims before them, the invention is susceptible to additional implementations or embodiments and certain of these details described in this application may be varied considerably without departing from the basic principles of the invention. It will thus be appreciated that those skilled in the art having the present drawings, specifications, and claims before them will be able to devise various arrangements which, although not explicitly described or shown herein, embody the principles of the invention and, thus, within its scope and spirit.

We claim:

1. A method for optimizing internet traffic flow through a web network containing a plurality of interlinked content elements on websites within the web network, providing access to a user via a user interface on a user device, to receive content served by a content server upon receiving a request from the user device, the method comprising:

collecting, by a tracking server coupled to the content server, content data corresponding to a single location of a content element within the plurality of interlinked content elements of the web network, dynamically accessed by the user during a visit to the web network, wherein the content element is a portion of a web page and the single location is a coordinate on the web page, and the content data includes data reflecting the number of times the user visited a particular content element and the number of times the user transitioned from one content element to another;

obtaining, an initial revenue value corresponding to each content element based on the corresponding content data;

calculating a subsequent flow value corresponding to at least one of value and revenue generated from subsequent flow during a visit by the user to the web network for viewing of other content elements, beginning at the location of the content element and associated with a probability of a transition from the content element to multiple of the plurality of interlinked content elements;

calculating an overall content value, by an iterative algorithm, for the content element based on a corresponding revenue value and a corresponding subsequent flow value; and modifying the web network based on the overall content value and the content data, by 1) embedding links to other content elements and 2) adding additional revenue-elements, to increase overall revenue generated by the web network.

2. The method of claim 1 wherein collecting content data comprises collecting traffic data and value data.

3. The method of claim 2 wherein the traffic data comprises transition values that reflect a total number of user transitions from one content element to other content elements and view values that reflect the total number of user views for each content element in the web network in a given period of time.

4. The method of claim 3 further comprising generating a result for use in modifying the web network based on the overall content value and the content data.

5. The method of claim 4 wherein the result comprises a ranking of a plurality of content elements based on corresponding overall content values.

6. The method of claim 4 wherein the result comprises a ranking of a plurality of content elements based on corresponding view values.

7. The method of claim 4 wherein the result comprises a scatter plot for a plurality of content elements based on corresponding view values and corresponding overall content values.

8. The method of claim 4 wherein the result comprises a correlation coefficient representing a correlation between overall content values and view values of a plurality of content elements.

9. The method of claim 8 wherein modifying comprises:
identifying at least one of the plurality of content elements with a significant imbalance between the identified content element's overall content value and view value, based on the correlation; and
modifying the web network so as to reduce the imbalance.

10. The method of claim 9 wherein modifying comprises altering interlinking between the plurality of interlinked content elements based on the correlation coefficient so as to reduce the imbalance.

11. The method of claim 1 wherein at least a portion of the content data is collected statically.

12. The method of claim 1 wherein at least a portion of the content data is collected dynamically.

13. The method of claim 1 wherein the content element is selected from at least one of a group comprising: a web page, a web page type, a web page element, a video, a widget, a flash module, an AJAX module, a display ad, and a combination of any of the foregoing.

14. The method of claim 13 wherein the content element is at least a portion of a web page that is part of an online advertising network.

15. The method of claim 2 wherein the value data is based at least in part on revenue based parameters.

16. The method of claim 15 wherein at least one revenue based parameter is selected from a group comprising advertising revenue, affiliate marketing revenue, sponsorship revenue, content licensing cost, data collection costs, web network maintenance costs, and ecommerce transaction revenue.

17. The method of claim 2 wherein the value data is based at least in part on nonrevenue based parameters.

18. The method of claim 17 wherein at least one nonrevenue based parameter is selected from a group comprising at least one of number of subscriptions, number of registrations, number of memberships, number of online transactions, number of offline transactions, ranking information, number of red pixels, and predetermined subjective value.

19. A system for determining an overall content value for a content element in a web network containing a plurality of interlinked content elements on websites within the web network, providing access to a user interface on a user device, to receive content served by a content server upon receiving a request from the user device, the system comprising:
an analytic server configured to receive content data relating to a single location of the content element within the interlinked content elements of the web network, dynamically accessed by the user during a visit to the web network, wherein the content element is a portion of a web page and the single location is a coordinate on the web page, and the content data includes data designating the number of times the user visited a particular content element and the number of times user transitioned from one content element to another; and
a processor in operable communication with the analytic server, the processor configured to receive an initial revenue value for each content element based on the content data, and to determine a subsequent flow value for the content element corresponding to at least one of value and revenue generated from subsequent flow during a visit by the user to the web network for viewing of other content elements, beginning at the location of the content element and associated with a probability of a transition from the content element to multiple of the plurality of interlinked content elements; the processor further configured to calculate an overall content value by an iterative algorithm, based on the initial revenue value and the subsequent flow value, the processor further configured to modify the web network based on the overall content value and the content data, by 1) embedding links to the other content elements and 2) adding additional revenue elements to increase overall revenue generated by the web network.

20. The system of claim 19 wherein the content data comprises traffic data, and the traffic data comprises transition values that designate a total number of user transitions from one content element to other content elements and view values that designate the total number of user views for each content element in the web network in a given period of time.

21. The system of claim 19 further comprising a filter module in operable communication with the analytic server, wherein the filter module is configured to filter a plurality of overall content values.

22. The system of claim 20 wherein the processor is configured to determine a correlation between overall content values and view values.

23. The system of claim 20 wherein the processor is configured to generate a scatter plot for a plurality of content elements based on corresponding view values and corresponding overall content values, such that content elements having a significant imbalance between overall content value and view value are easily identifiable.

24. The system of claim 19 wherein the analytic server is in communication with a content management system and is configured to modify the web network based on the overall content value and the content data.

25. The system of claim 19 wherein the analytic server is configured to dynamically receive traffic data.

26. The system of claim 19 wherein the analytic server is configured to dynamically receive value data.

27. The system of claim 19 wherein the content element is selected from a group comprising: a web page, a web page type, a web page element, a video, a widget, a flash module, an AJAX module, a display ad, and a combination of any of the foregoing.

28. The system of claim 27 wherein the content element is within a web page that is part of an online advertising network.

29. A method for determining an overall content value for a content element in a web network containing a plurality of interlinked content elements on websites within the web network, providing access to a user via a user interface on a user device, to receive content served by a content server upon receiving a request from the user device, the method comprising:
obtaining, by an analytics server, content data related to a single location of the content element within the interlinked content elements of the web network, dynamically accessed by the user during a visit to the web network, wherein the content element is a portion of the web page and the single location is a coordinate on the web page, and the content data includes data designating the number of times the user visits a particular content element and the number of times the user transitions from one content element to another;

obtaining an initial revenue value corresponding to each content element;

calculating a subsequent flow value corresponding to at least one of value and revenue generated from subsequent flow during a visit by the user to the web network for viewing of other content elements, beginning at the location of the content element and associated with a probability of a transition from the content element to multiple of the plurality of interlinked content elements; and calculating the overall content value, by iterative algorithm, for the content element based on the revenue value and subsequent flow value; and modifying the web network based on the overall content value and the content data, by 1) embedding links to other content elements and adding additional revenue-elements to increase overall revenue generated by the web network.

30. The method of claim 29 wherein the content data comprises transition values to designate a total number of user transitions from one content element to other content elements and view values to designate the total number of user views for each content element in the web network in a given period of time.

31. The method of claim 29 wherein the content element is selected from a group comprising: a web page, a web page type, a web page element, a video, a widget, a flash module, an AJAX module, a display ad, and a combination of any of the foregoing.

32. The method of claim 31 wherein the content element is within a web page that is part of an online advertising network.

* * * * *